US012636864B2

(12) United States Patent
Tanaka et al.

(10) Patent No.: US 12,636,864 B2
(45) Date of Patent: May 26, 2026

(54) GAS BARRIER FILM, LAMINATE, AND PACKAGING MATERIAL

(71) Applicant: TOPPAN INC., Tokyo (JP)

(72) Inventors: Ryota Tanaka, Tokyo (JP); Haruka Omori, Tokyo (JP); Kenta Osawa, Tokyo (JP); Kenji Matsuhisa, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 18/544,875

(22) Filed: Dec. 19, 2023

(65) Prior Publication Data

US 2024/0149572 A1      May 9, 2024

Related U.S. Application Data

(63) Continuation of application No. PCT/JP2022/024648, filed on Jun. 21, 2022.

(30) Foreign Application Priority Data

Jun. 21, 2021   (JP) ................................. 2021-102659
Jun. 21, 2021   (JP) ................................. 2021-102660

(51) Int. Cl.
    B32B 27/08          (2006.01)
    B32B 7/12           (2006.01)
          (Continued)
(52) U.S. Cl.
    CPC ................ B32B 27/08 (2013.01); B32B 7/12 (2013.01); B32B 27/32 (2013.01); B32B 33/00 (2013.01);
          (Continued)

(58) Field of Classification Search
    CPC ........... B32B 27/08; B32B 27/32; B32B 7/12; B32B 33/00; B32B 2250/02;
          (Continued)

(56) References Cited

U.S. PATENT DOCUMENTS

| | | | | |
|---|---|---|---|---|
| 5,300,353 A | * | 4/1994 | Yoshimura | .............. B32B 27/08 |
| | | | | 428/910 |
| 2011/0226723 A1 | | 9/2011 | Schade et al. | |

(Continued)

FOREIGN PATENT DOCUMENTS

| | | | |
|---|---|---|---|
| EP | 3 998 157 A1 | 5/2022 | |
| EP | 4 101 639 A1 | 12/2022 | |

(Continued)

OTHER PUBLICATIONS

Kelly R. Frey, Polyethylene & Polypropylene in Flexible Barrier Packaging, 2009 Consumer Packaging Solutions for Barrier Performance Course, 2009 (Year: 2009).*

(Continued)

*Primary Examiner* — Michael Zhang
(74) *Attorney, Agent, or Firm* — STAAS & HALSEY LLP

(57)                    ABSTRACT

A gas barrier film includes a base material containing a polyethylene as a main resin component and an inorganic oxide layer formed on a first surface side of the base material. The birefringence $\Delta N$ of the first surface calculated based on measurement by a parallel Nicol rotation method is 0 or more and 0.007 or less, and the proportion of the polyethylene in the entire gas barrier film is 90 mass % or more.

12 Claims, 2 Drawing Sheets

(51) Int. Cl.
*B32B 27/32* (2006.01)
*B32B 33/00* (2006.01)

(52) U.S. Cl.
CPC ....... *B32B 2250/02* (2013.01); *B32B 2307/31* (2013.01); *B32B 2307/42* (2013.01); *B32B 2307/7242* (2013.01); *B32B 2553/00* (2013.01)

(58) Field of Classification Search
CPC ........... B32B 2307/31; B32B 2307/42; B32B 2307/7242; B32B 2553/00
See application file for complete search history.

(56) References Cited

U.S. PATENT DOCUMENTS

| | | |
|---|---|---|
| 2019/0022988 A1 | 1/2019 | Chen et al. |
| 2019/0240956 A1* | 8/2019 | Takasugi ................ B65D 65/40 |
| 2021/0023828 A1* | 1/2021 | Yamada ................ B65D 31/08 |
| 2023/0166894 A1* | 6/2023 | Yamada ................ B32B 27/308 |
| | | 428/36.91 |

FOREIGN PATENT DOCUMENTS

| | | | |
|---|---|---|---|
| EP | 4 223 663 A1 | | 8/2023 |
| EP | 4 245 534 A1 | | 9/2023 |
| JP | 2000006304 A | * | 1/2000 |
| JP | 2000-254994 | | 9/2000 |
| JP | 2000-355068 | | 12/2000 |
| JP | 2001-157705 | | 6/2001 |
| JP | 2004-203023 | | 7/2004 |
| JP | 2005-271327 | | 10/2005 |
| JP | 4373797 | | 11/2009 |
| JP | 2013-022918 | | 2/2013 |
| JP | 6191221 | | 9/2017 |
| JP | 2018051925 A | * | 4/2018 |
| JP | 2019-171861 | | 10/2019 |
| JP | 2019171863 A | * | 10/2019 |
| JP | 2020-055157 | | 4/2020 |
| JP | 2021053993 A | * | 4/2021 |
| WO | WO 03/009998 A1 | | 2/2003 |
| WO | WO 2019/189092 A1 | | 10/2019 |
| WO | WO 2021/029156 A1 | | 2/2021 |
| WO | WO 2021/176948 A1 | | 9/2021 |
| WO | WO 2022/071248 A1 | | 4/2022 |

OTHER PUBLICATIONS

Espacenet Translation of JP-2021053993-A (Year: 2024).*
Espacenet Translation of JP2018051925A (Year: 2024).*
Espacenet Translation of JP-2000006304-A (Year: 2024).*
Papajani, Blerina, et al. "The study of phase compound and the degree of crystallinity of recycled LDPE by X-ray diffractometer and optical microscope." Int J Sci Res 4.2 (2015): 2228-3239. (Year: 2015).*
BPF, Polyethylene (Low Density) LDPE, LLDPE, https://web.archive.org/web/20190809045658/https://www.bpf.co.uk/plastipedia/polymers/LDPE.aspx, 2019 (Year: 2019).*
Zafar, Rabia, Seon Yeong Park, and Chang Gyun Kim. "Surface modification of polyethylene microplastic particles during the aqueous-phase ozonation process." Environmental Engineering Research 26.5 (2021). (Year: 2020).*
Espacenet translation of JP-2019171863-A (Year: 2025).*
International Search Report issued in International Application No. PCT/JP2022/024648 dated Sep. 13, 2022.
Written Opinion issued in International Application No. PCT/JP2022/024648 dated Sep. 13, 2022.
European Search Report issued in counterpart European Application No. 22828407.1 dated Sep. 18, 2024.
Chatterjee Tirtha et al: "Machine direction orientation of high density polyethylene (HDPE): Barrier and optical properties", Polymer, Elsevier, Amsterdam, NL, vol. 55, No. 16, Jun. 16, 2014, pp. 4102-4115.
Tabatabaei S.H. et al: "Effect of Machine Direction Orientation Conditions On Properties of Hdpe Films", Journal of Plastic Film and Sheeting, vol. 25, No. 3-4, Jul. 1, 2009, pp. 235-249.

* cited by examiner

GAS BARRIER FILM, LAMINATE, AND PACKAGING MATERIAL

CROSS REFERENCE TO RELATED APPLICATIONS

This application is a continuation application based on PCT International Patent Application No. PCT/JP2022/024648, filed on Jun. 21, 2022, which claims priority to Japanese Patent Application No. 2021-102659, filed on Jun. 21, 2021, and Japanese Patent Application No. 2021-102660, filed Jun. 21, 2021, in the Japan Patent Office. The contents of both the Japanese Patent Application and the PCT Application are incorporated herein by reference.

TECHNICAL FIELD

The present invention relates to a gas barrier film. A laminate and a packaging material in which this gas barrier film is used will also be mentioned.

BACKGROUND ART

Packaging materials that are used to package food, medication, and the like are required to have a property of preventing the ingress of gases that modify the contents (water vapor, oxygen, and others), that is, a gas barrier property, to suppress alteration, decomposition, or the like of the contents and maintain the function or quality thereof. Therefore, for these packaging materials, film materials having a gas barrier property (gas barrier films) are used.

As the gas barrier films, films having a gas barrier layer made of a material having a gas barrier property provided on the surface of a resin base material are known. As the gas barrier layer, metal foils, metal-deposited films, and membranes formed by a wet coating method are known. Regarding the membranes, as membranes exhibiting an oxygen barrier property, resin films formed of a coating agent containing a water-soluble polymer or a resin such as polyvinylidene chloride or inorganic layered mineral composite resin films formed of a coating agent containing a water-soluble polymer and an inorganic layered mineral are known (Japanese Patent No. 6191221 (Patent Document 1)). Furthermore, as the gas barrier layer, a gas barrier layer in which a deposited thin film layer made of an inorganic oxide and a gas barrier composite coating containing an aqueous polymer, an inorganic layered compound, and a metal alkoxide are sequentially laminated (Japanese Unexamined Patent Application, First Publication No. 2000-254994 (Patent Document 2)) or a gas barrier layer containing a polyvalent metal salt of a carboxylic acid that is a reaction product of a carboxy group of a polycarboxylic acid-based polymer and a polyvalent metal compound (Japanese Patent No. 4373797 (Patent Document 3)) have been proposed.

In recent years, there has been a demand for an additional increase in the efficiency of the sorted collection and recycling of plastic materials due to growing environmental awareness arising from a problem of plastic trash in the ocean or the like. Packaging laminates for which attempts have thus far been made to enhance performance by combining a variety of dissimilar materials are also not an exception, and there has been a demand for mono-material packaging.

In order to realize mono-material packaging in laminates, there is a need to use resin materials of the same category for a film configuring each layer. For example, polyethylene, which is a kind of polyolefin, is in wide use as packaging materials, and thus mono-material packaging in laminates for which polyethylene is used is being expected.

In order to realize mono-material packaging, for example, Japanese Unexamined Patent Application, First Publication No. 2020-055157 (Patent Document 4) proposes a laminate in which a polyethylene-based film including a deposited layer is used for a base material and at least one surface of a heat seal layer and discloses a stretched polyethylene as the base material from the viewpoint of printability and bag making suitability.

SUMMARY OF INVENTION

The present inventors found that, when the laminate described in Patent Document 4 is applied to a packaging bag, a standing pouch or the like, there are cases where the adhesion between the stretched polyethylene base material and a linear low-density polyethylene that is the heat seal layer, which configure the laminate, is not sufficient depending on contents to be packaged. When the adhesion is not sufficient, there is a possibility that delamination may occur in the laminate or packaging materials may break.

The inventors solved this problem while maintaining the configuration of mono-material packaging.

Based on the above-described circumstances, an objective of the present invention is to provide a gas barrier film capable of configuring an easily recyclable laminate in which a base material and a heat seal layer sufficiently adhere to each other.

A first aspect of the present invention is a gas barrier film including a base material containing a polyethylene as a main resin component and an inorganic oxide layer formed on a first surface side of the base material.

In this gas barrier film, birefringence $\Delta N$ of the first surface calculated based on measurement by a parallel Nicol rotation method is 0 or more and 0.007 or less.

A proportion of the polyethylene in the entire gas barrier film is 90 mass % or more.

A second aspect of the present invention is a laminate including the gas barrier film according to the first aspect and a heat seal layer containing a polyethylene as a main resin component and being joined to the gas barrier film such that the inorganic oxide layer is sandwiched between the base material and the heat seal layer.

A proportion of the polyethylene in the entire laminate is 90 mass % or more.

A third aspect of the present invention is a packaging material formed using the laminate according to the second aspect.

A fourth aspect of the present invention is a gas barrier film including a base material containing a polyethylene as a main resin component and an inorganic oxide layer formed on a first surface side of the base material.

In this gas barrier film, crystallinity of the base material on the first surface side is 35% or less.

A proportion of the polyethylene in the entire gas barrier film is 90 mass % or more.

A fifth aspect of the present invention is a laminate including the gas barrier film according to the fourth aspect and a heat seal layer containing a polyethylene as a main resin component and being joined to the gas barrier film such that the inorganic oxide layer is sandwiched between the base material and the heat seal layer.

A proportion of the polyethylene in the entire laminate is 90 mass % or more.

A sixth aspect of the present invention is a packaging material formed using the laminate according to the fifth aspect.

According to the present invention, it is possible to provide a gas barrier film capable of configuring an easily recyclable laminate in which a base material and a heat seal layer sufficiently adhere to each other.

DESCRIPTION OF EMBODIMENTS

First Embodiment

Hereinafter, a first embodiment of the present invention will be described with reference to FIG. 1.

Figure 1:
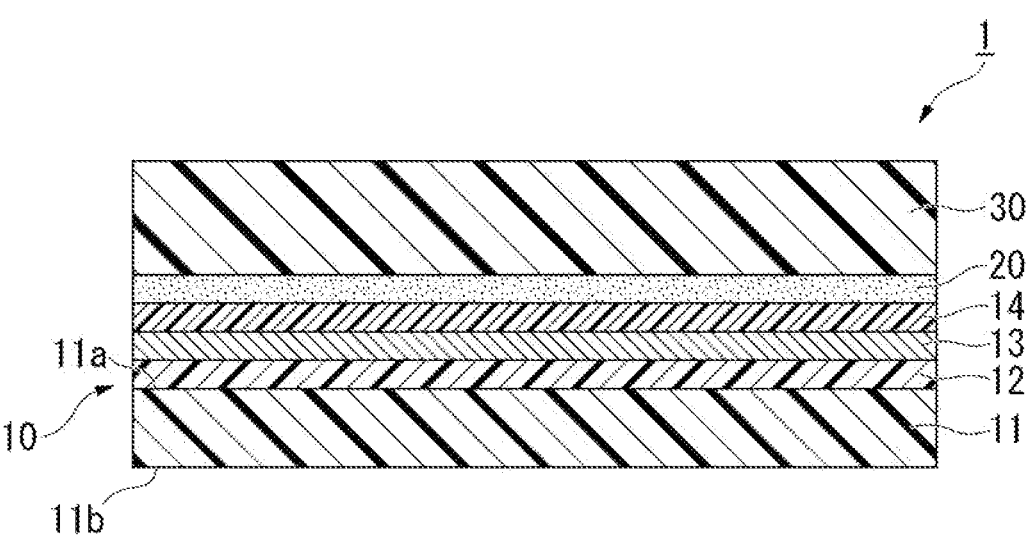
FIG. 1 is a schematic cross-sectional view of a laminate according to a first embodiment of the present invention.

FIG. 1 is a schematic cross-sectional view of a laminate 1 according to the present embodiment. The laminate 1 includes a gas barrier film 10 and a heat seal layer 30. The gas barrier film 10 of the present embodiment is one aspect of a gas barrier film according to the present invention.

The gas barrier film 10 and the heat seal layer 30 are joined together through an adhesive layer 20.

The proportion of a polyethylene in the laminate 1 is 90 mass % or more. This makes the laminate 1 be composed of a highly recyclable mono-material.

The gas barrier film 10 includes a sheet-like base material 11 and an undercoat layer 12, an inorganic oxide layer 13 and an overcoat layer 14 sequentially formed on a first surface 11a of the base material 11.

The proportion of a polyethylene in the gas barrier film 10 is 90 mass % or more. This makes the gas barrier film 10 be composed of a highly recyclable mono-material.

Hereinafter, each configuration of the gas barrier film 10 will be described.

The base material 11 contains a polyethylene (PE). The base material 11 may contain a polyethylene alone as a resin component. The base material 11 may be any of a single-layer film composed of a single resin or a single-layer or laminate film for which a plurality of resins is used. In addition, PE may be laminated on a different base material (metal, wood, paper, ceramics or the like). That is, the base material 11 may be a single layer or may be two or more layers.

The base material 11 may be an unstretched film or may be a stretched (uniaxially or biaxially stretched) film.

The density of PE in the base material 11 is preferably 0.935 or higher and more preferably 0.940 or higher. When the density of PE is within the above-described range, it is easy to suppress the elongation of the base material 11 during rolling and the consequent formation of wrinkles, and it is easy to suppress the generation of cracks in the inorganic oxide layer 13.

PE may be at least one polymer selected from a homopolymer, a random copolymer and a block copolymer. The homopolymer is a polyethylene made of polyethylene alone. The random copolymer is a polyethylene in which ethylene, which is a main monomer, and a small amount of a comonomer that is different from the ethylene (for example, an α-olefin) randomly copolymerize and form a homogeneous phase. The block copolymer is a polyethylene in which ethylene, which is a main monomer, and the above-described comonomer (for example, an α-olefin) block-copolymerize or polymerize into a rubber form and thereby form a heterogeneous phase.

The base material 11 may be a multilayer configuration including a plurality of layers (films) each containing PE having a different density. It is desirable to configure the base material 11 to include multiple layers as appropriate in consideration of the processability, stiffness or bending stiffness and heat resistance of a film configuring each layer, powder falling during conveyance or the like. The films that configure the base material 11 can be produced by appropriately selecting and using a high-density polyolefin, a medium-density polyolefin, a low-density polyolefin or the like. Even in this case, the density is preferably 0.935 or higher when the density is measured for the entire base material 11.

Each layer of the base material 11 may contain a slip agent, an antistatic agent or the like, and the content or content rate thereof may vary with each layer. The base material 11 including a plurality of layers can be produced by extrusion coating, co-extrusion coating, sheet forming, co-extrusion blow forming or the like.

On the first surface 11a of the base material 11, a surface treatment such as a chemical treatment, a solvent treatment, a corona treatment, a low-temperature plasma treatment or an ozone treatment may be performed to improve the adhesiveness to the undercoat layer 12 or the inorganic oxide layer 13. Furthermore, the same surface treatment may also be performed on a second surface 11b on the opposite side to the first surface 11a for the purpose of attachment to a printed base material.

The base material 11 may contain an additive such as a filler, an anti-blocking agent, an antistatic agent, a plasticizer, a lubricant or an antioxidant. Any one of these additives may be used singly or two or more additives may be jointly used.

The thickness of the base material 11 is not particularly limited and can be determined as appropriate depending on the price or the use in consideration of the suitability as a packaging material or the lamination suitability of other membranes. The thickness of the base material 11 is, practically, preferably within a range of 3 μm to 200 μm, more preferably within a range of 5 μm to 120 μm, still more preferably within a range of 6 μm to 100 μm and particularly preferably within a range of 10 μm to 40 μm.

(Undercoat Layer 12)

The undercoat layer 12 is a layer containing an organic polymer as a main component and is referred to as a primer layer in some cases. The undercoat layer 12 provided makes it possible to improve the film formation property or adhesion strength of the inorganic oxide layer 13.

The amount of the organic polymer in the undercoat layer 12 may be, for example, 70 mass % or more and 80 mass % or more. As the organic polymer, a polyacrylic resin, a polyester resin, a polycarbonate resin, a polyurethane resin, a polyamide resin, a polyolefin resin, a polyimide resin, a melamine resin, a phenolic resin and the like are exemplary examples. When the hydrolysis resistance of the adhesion strength between the base material 11 and the inorganic oxide layer 13 is taken into account, the undercoat layer 12 preferably contains, among the above-described organic polymers, at least one of a polyacrylic resin, a polyol-based resin, a polyurethane-based resin, a polyamide-based resin or a reaction product of this organic polymer.

The undercoat layer 12 may contain a silane coupling agent, organic titanate, modified silicone oil or the like.

As the organic polymer that is used in the undercoat layer 12, an organic polymer having a urethane bond generated by a reaction between a polyol having two or more hydroxyl groups at a polymer end and an isocyanate compound or an organic polymer containing a reaction product of a polyol having two or more hydroxyl groups at a polymer end and an organic silane compound such as a silane coupling agent or a hydrolyzate thereof is more preferable. One of these may be used or both may be used.

As the polyol, for example, at least one selected from an acrylic polyol, a polyvinyl acetal, a polystyrene polyol, a polyurethane polyol and the like is an exemplary example. The acrylic polyol may be an organic polymer that is obtained by polymerizing an acrylic acid derivative monomer or may be an organic polymer that is obtained by copolymerizing an acrylic acid derivative monomer and a different monomer. As the acrylic acid derivative monomer, ethyl methacrylate, hydroxyethyl methacrylate, hydroxypropyl methacrylate, hydroxybutyl methacrylate and the like are exemplary examples. As the monomer that is copolymerized with the acrylic acid derivative monomer, styrene and the like are exemplary examples.

The isocyanate compound has an action of enhancing the adhesion between the base material 11 and the inorganic oxide layer 13 by a urethane bond that is generated by a reaction with the polyol. That is, the isocyanate compound functions as a crosslinking agent or a curing agent. As the isocyanate compound, for example, monomers such as aromatic tolylene diisocyanate (TDI), diphenylmethane diisocyanate (MDI), aliphatic xylene diisocyanate (XDI), hexamethylene diisocyanate (HMDI) and isophorone diisocyanate (IPDI), polymers thereof and derivatives thereof are exemplary examples. The above-described isocyanate compounds may be used singly or two or more isocyanate compounds may be combined.

As the silane coupling agent, for example, vinyltrimethoxysilane, γ-chloropropylmethyldimethoxysilane, γ-chloropropyltrimethoxysilane, glycidoxypropyltrimethoxysilane, γ-methacryloxypropyltrimethoxysilane, γ-methacryloxypropylmethyldimethoxysilane and the like are exemplary examples. The organic silane compound may be a hydrolyzate of one of these silane coupling agents. As the organic silane compound, one of the above-described silane coupling agents and hydrolyzates thereof may be used singly or a combination of two or more may be contained.

The undercoat layer 12 can be formed using a liquid mixture obtained by blending the above-described component with an organic solvent in an arbitrary proportion. The liquid mixture may contain, for example, a curing accelerator such as a tertiary amine, an imidazole derivative, a metal salt compound of a carboxylic acid, a quaternary ammonium salt or a quaternary phosphonium salt; a phenolic, sulfur-based, phosphite-based or other antioxidant; a leveling agent; a flow control agent; a catalyst; a cross-linking reaction accelerator; a filler or the like.

The liquid mixture can be disposed on the base material 11 in layers using a well-known printing method such as an offset printing method, a gravure printing method, or a silk screen printing method or a well-known application method such as roll coating, knife edge coating, or gravure coating. The disposed mixed liquid is heated, for example, to 50° C. to 200° C., whereby the undercoat layer 12 can be formed.

The thickness of the undercoat layer 12 is not particularly limited and may be set within a range of, for example, 0.005 to 5 µm. The thickness can be determined as appropriate depending on the use or required characteristics. The thickness of the undercoat layer 12 is preferably within a range of 0.01 to 1 µm and more preferably within a range of 0.01 to 0.5 µm. When the thickness of the undercoat layer 12 is 0.01 or more, a sufficient adhesion strength can be obtained between the base material 11 and the inorganic oxide layer 13, and the oxygen barrier property also becomes favorable. When the thickness of the undercoat layer 12 is 1 µm or less, it is easy to form a uniform coated surface, and the dry load or the manufacturing cost can be suppressed.

(Inorganic Oxide Layer 13)

As an inorganic oxide that configures the inorganic oxide layer 13, aluminum oxide, silicon oxide, magnesium oxide, titanium oxide, tin oxide, zinc oxide, indium oxide and the like are exemplary examples. Particularly, the inorganic oxide layer 13 may be composed of aluminum oxide or silicon oxide. Aluminum oxide or silicon oxide is preferable since the productivity is excellent, and the heat-resistant or wet and heat-resistant oxygen barrier property and water vapor barrier property are excellent. The inorganic oxide layer 13 may be formed of one inorganic oxide or may be formed of two or more appropriately-selected inorganic oxides.

The thickness of the inorganic oxide layer 13 can be set to 1 nm or more and 200 nm or less. When the thickness is 1 nm or more, an excellent oxygen barrier property and an excellent water vapor barrier property can be obtained. When the thickness is 200 nm or less, the manufacturing cost can be suppressed at a low level, cracks are less likely to be generated due to an external force such as bending or pulling, and the deterioration of the barrier property can be suppressed.

The inorganic oxide layer 13 can be formed by, for example, a well-known film formation method such as a vacuum deposition method, a sputtering method, an ion plating method or a plasma vapor deposition method (CVD).

(Overcoat Layer 14)

The overcoat layer 14 may be a well-known oxygen barrier membrane that is formed by a wet coating method. The overcoat layer is an optional configuration and may not be provided.

The overcoat layer 14 can be obtained by forming a coating film made of a coating agent by a wet coating method on any layer of the base material 11, the undercoat layer 12 and the inorganic oxide layer 13 and drying this coating film. In the present specification, "coating film" means a wet film, and "membrane" means a dry film, respectively.

As the overcoat layer 14, a membrane containing at least one of a metal alkoxide and a hydrolyzate thereof or a reaction product thereof and a water-soluble polymer (hereinafter, referred to as "organic inorganic composite membrane" in some cases) may be included. Furthermore, at least one of a silane coupling agent and a hydrolyzate thereof is preferably further contained.

As the metal alkoxide and the hydrolyzate thereof in the organic inorganic composite membrane, for example, compounds represented by a general formula $M(OR)_n$ such as tetraethoxysilane $[Si(OC_2H_5)_4]$ and aluminum triisopropoxide $[Al(OC_3H_7)_3]$ and hydrolyzates thereof are exemplary examples. Only one of these may be contained or two or more may be appropriately combined and contained.

The total amount of at least one of the metal alkoxide and the hydrolyzate thereof or the reaction product thereof in the organic inorganic composite membrane is, for example, within a range of 40 to 70 mass %. From the viewpoint of further reducing the oxygen transmission rate, the lower limit of the total amount may be 50 mass %, and the upper limit of the total amount may be 65 mass %.

The water-soluble polymer in the organic inorganic composite membrane is not particularly limited, and, for example, polysaccharides such as polyvinyl alcohol-based polysaccharides and starch/methylcellulose/carboxymethylcellulose and a variety of polymers such as acrylic polyol-based polymers are exemplary examples. From the viewpoint of further improving the oxygen gas barrier property, a polyvinyl alcohol-based polymer is preferably contained. The number-average molecular weight of the water-soluble polymer is, for example, within a range of 40000 to 180000.

The polyvinyl alcohol-based water-soluble polymer can be obtained by, for example, saponifying (or partially saponifying) polyvinyl acetate. In this water-soluble polymer, several tens of percents of an acetic acid group may remain or only several percents of an acetic acid group may remain.

The amount of the water-soluble polymer in the organic inorganic composite membrane is, for example, within a range of 15 to 50 mass %. When the amount of the water-soluble polymer is within a range of 20 to 45 mass %, the oxygen transmission rate of the organic inorganic composite membrane can be further reduced, which is preferable.

As the silane coupling agent and the hydrolyzate thereof in the organic inorganic composite membrane, silane coupling agents having an organic functional group are exemplary examples. As such a silane coupling agent and such a hydrolyzate thereof, ethyltrimethoxysilane, vinyltrimethoxysilane, γ-chloropropylmethyldimethoxysilane, γ-chloropropyltrimethoxysilane, glycidoxypropyltrimethoxysilane, γ-methacryloxypropyltrimethoxysilane, γ-methacryloxypropylmethyldimethoxysilane and hydrolyzates thereof are exemplary examples. Only one of these may be contained or two or more may be appropriately combined and contained.

As at least one of the silane coupling agent and the hydrolyzate thereof, a silane coupling agent or hydrolyzate thereof having an epoxy group as the organic functional group is preferably used. As the silane coupling agent having an epoxy group, for example, γ-glycidoxypropyltrimethoxysilane and β-(3,4-epoxycyclohexy)ethyltrimethoxysilane are exemplary examples. The silane coupling agent or hydrolyzate thereof having an epoxy group may also have another organic functional group that is different from the epoxy group such as a vinyl group, an amino group, a methacrylic group or an ureyl group.

The silane coupling agent and hydrolyzate thereof having an organic functional group are capable of further improving the oxygen barrier property of the overcoat layer 14 and the adhesion to the undercoat layer 12 or the inorganic oxide layer 13 by the interaction between the organic functional group and the hydroxyl group of the water-soluble polymer. In particular, the epoxy group of the silane coupling agent or the hydrolyzate thereof and the hydroxyl group of a polyvinyl alcohol are capable of configuring the overcoat layer 14 being particularly excellent in terms of an oxygen barrier property and adhesion by the interaction.

The total amount of at least one of the silane coupling agent and the hydrolyzate thereof or the reaction product thereof in the organic inorganic composite membrane is, for example, within a range of 1 to 15 mass %. When the total amount of at least one of the silane coupling agent and the hydrolyzate thereof or the reaction product thereof is within a range of 2 to 12 mass %, the oxygen transmission rate of the organic inorganic composite membrane can be further reduced, which is preferable.

The organic inorganic composite membrane may contain a crystalline inorganic layered compound having a layer structure. As the inorganic layered compound, for example, clay minerals represented by the kaolinite group, the smectite group, the mica group or the like are exemplary examples. These can be used singly or two or more can be appropriately combined and used. The particle diameters of the inorganic layered compound are, for example, within a range of 0.1 to 10 μm. The aspect ratios of the inorganic layered compound are, for example, within a range of 50 to 5000.

As the inorganic layered compound, a clay mineral from the smectite group is preferable since a membrane having an excellent oxygen barrier property and an excellent adhesion strength can be formed by the intercalation of the water-soluble polymer between the layers of the layer structure. Specific examples of the clay mineral from the smectite group include montmorillonite, hectorite, saponite, water-swellable mica and the like. In a case where water-swellable mica is contained in the overcoat layer 14, when a hydrothermal treatment such as a boiling treatment is performed on the film, the layer structure of the water-swellable mica collapses, and, consequently, there are cases where an expected function is not sufficiently exhibited. Therefore, the gas barrier film 10 may be configured not to include the oxygen barrier membrane containing water-swellable mica.

The thickness of the overcoat layer 14 is set depending on a required oxygen barrier property, can be set, for example, within a range of 0.05 to 5 μm and is preferably within a range of 0.05 to 1 μm and more preferably within a range of 0.1 to 0.5 μm. When the thickness of the overcoat layer 14 is 0.05 μm or more, it is easy to obtain a sufficient oxygen barrier property. When the thickness of the overcoat layer 14 is 1 μm or less, it is easy to form a uniform coated surface, and the dry load or the manufacturing cost can be suppressed.

The overcoat layer 14 made of the organic inorganic composite membrane exhibits an excellent oxygen barrier property even after a boiling treatment or a retort sterilization treatment. The laminate 1 having a sealant film joined to the gas barrier film 10 has a sufficient adhesion strength or seal strength as a packaging material for a boiling or retort treatment and, furthermore, has both transparency and bending resistance or stretching resistance that metal foils or metal-deposited films do not have. Furthermore, the laminate has an advantage of no risk of the generation of a hazardous substance such as dioxin.

(Adhesive Layer 20)

A well-known adhesive for dry lamination may be used as the adhesive layer 20. Adhesives can be used with no particular limitations as long as the adhesives are for dry lamination, and specific examples include two-liquid curable ester-based adhesives, ether-based adhesives, urethane-based adhesives and the like.

A gas barrier adhesive that exhibits a gas barrier property after curing may also be used as the adhesive layer 20. The use of the gas barrier adhesive makes it possible to improve the gas barrier property of the laminate 1. The oxygen transmission rate of the gas barrier adhesive is preferably 150 cc/m$^2$·day·atm or less, more preferably 100 cc/m$^2$·day·atm or less, still more preferably 80 cc/m$^2$·day·atm or less and particularly preferably 50 cc/m$^2$·day·atm or less. When the oxygen transmission rate is within the above-described range, it is possible to sufficiently improve the gas barrier property of the laminate 1, and, even when minor cracks or the like are generated in the inorganic oxide layer 13 or the overcoat layer 14, the gas barrier adhesive enters gaps therebetween, which makes it possible to suppress the degradation of the gas barrier property.

As the gas barrier adhesive, an epoxy-based adhesive, a polyester/polyurethane-based adhesive and the like are exemplary examples. Specific examples of the gas barrier adhesive include "MAXIVE" manufactured by Mitsubishi Gas Chemical Company, Inc., "Paslim" manufactured by DIC Corporation and the like.

In a case where the adhesive layer 20 is made of the gas barrier adhesive, the thickness of the adhesive layer 20 is preferably 50 times or more the thickness of the inorganic oxide layer 13. When the thickness is within the above-described range, it is possible to more sufficiently suppress the cracking of the inorganic oxide layer 13 and to further improve the gas barrier property of the laminate 1. Further-more, it is possible to impart a cushioning property, which relaxes external impacts, to the adhesive layer 20 and to prevent the cracking of the inorganic oxide layer 13 attrib-uted to the impacts. The thickness of the adhesive layer 20 is preferably 300 times or less the thickness of the inorganic oxide layer 13 from the viewpoint of the maintaining of the flexibility, processability and cost of the laminate 1.

When indicated by a numerical value, such a thickness of the adhesive layer 20 is, for example, within a range of 0.1 to 20 μm, preferably within a range of 0.5 to 10 μm and more preferably within a range of 1 to 5 μm.

The adhesive forming the adhesive layer 20 can be applied by, for example, a bar coating method, a dipping method, a roll coating method, a gravure coating method, a reverse coating method, an air knife coating method, a comma coating method, a die coating method, a screen printing method, a spray coating method, a gravure offset method or the like. The temperature at the time of drying the coating film of the adhesive can be set, for example, within a range of 30° C. to 200° C. and is preferably within a range of 50° C. to 180° C. The temperature at the time of curing the coating film can be set, for example, within a range of room temperature to 70° C. and is preferably within a range of 30° C. to 60° C. When the temperatures during the drying and the curing are set within the above-described ranges, it is possible to further suppress the generation of cracks in the inorganic oxide layer 13 or the adhesive layer 20 and to develop an excellent gas barrier property.

From the viewpoint of preventing the cracking of the inorganic oxide layer 13, the adhesive layer 20 and the inorganic oxide layer 13 are preferably in direct contact with each other, but there may be another layer between the adhesive layer 20 and the inorganic oxide layer 13.

(Heat Seal Layer 30)

The heat seal layer 30 is a layer containing a polyolefin and functions as a sealant at the time of manufacturing packaging bags or the like using the laminate 1. A polyolefin film may be used as the heat seal layer 30. The use of a polyethylene film as the heat seal layer 30 makes it possible to make the laminate 1 into a mono-material. The heat seal layer 30 may contain only a polyethylene as a resin com-ponent.

As a polyolefin-based resin that is used for the heat seal layer 30, it is possible to use ethylene-based resins such as a low-density polyethylene resin (LDPE), a medium-density polyethylene resin (MDPE), a linear low-density polyethyl-ene resin (LLDPE), an ethylene-vinyl acetate copolymer (EVA), an ethylene-α-olefin copolymer and an ethylene- (meth)acrylic acid copolymer, polypropylene-based resins such as a blended resin of polyethylene and polybutene, a homopolypropylene resin (PP), a propylene-ethylene ran-dom copolymer, a propylene-ethylene block copolymer and a propylene-α-olefin copolymer and the like. These thermo-plastic resins can be selected as appropriate depending on the intended use or the temperature condition of a boiling treatment or the like.

To the heat seal layer 30, a variety of additives such as a flame retardant, a slip agent, an anti-blocking agent, an antioxidant, a light stabilizer and a tackifier may be added.

The thickness of the heat seal layer 30 can be set as appropriate in consideration of the shape of a packaging bag to be manufactured, the mass of contents to be accommo-dated or the like and may be set, for example, within a range of 30 to 150 μm.

In the case of manufacturing the laminate 1 including the adhesive layer 20 and the heat seal layer 30 using a poly-olefin film, it is possible to apply any of a dry lamination method in which the heat seal layer is attached with an adhesive such as a one-liquid curable or two-liquid curable urethane-based adhesive and a non-solvent dry lamination method in which the heat seal layer is attached using a solventless adhesive.

As another method, it is also possible to form the heat seal layer 30 by an extrusion lamination method in which a thermoplastic resin is heated, melted, extruded in a curtain shape and attached or the like. In this case, the adhesive layer 20 may be omitted.

What has been described above is the basic configuration of the laminate 1. In the laminate 1, the inorganic oxide layer 13 is positioned between the base material 11 and the heat seal layer.

The gas barrier film 10 alone can be used for a variety of packaging bags requiring a gas barrier property; however, when one or a plurality of laminates each having the heat seal layer 30 provided on the gas barrier film 10 are prepared, and the fringes are thermally fused together with the heat seal layers 30 facing each other, it is possible to form a variety of packaging materials such as packaging bags and standing bags for which the laminate 1 is used.

As a result of a variety of studies regarding cases where the adhesion between the base material 11 containing a polyethylene and the heat seal layer 30 is not sufficient, the present inventors found that the adhesion changed depend-ing on the birefringence of the base material 11. Birefrin-gence ΔN refers to an absolute value of a difference Nx−Ny between the refractive index Nx in an MD direction of the base material 11 and the refractive index Ny in a TD direction and can be measured and calculated by a parallel Nicole rotation method.

An example of a method for measuring the birefringence ΔN will be described below.

On a film of a measurement object, uniaxially polarized measurement light (wavelength: 586.6 nm) is made incident in the normal direction to the film. Light that has penetrated the film decomposes into a linearly polarized light in the MD direction and a linearly polarized light in the TD direction, and the refractive indexes Nx and Ny of the individual linearly polarized lights are measured. The birefringence ΔN is calculated based on the measured refractive indexes Nx and Ny.

The MD (machine direction) direction and the TD (tra-verse direction) direction refer to two directions orthogonal to each other that are regulated in resin films. Ordinarily, in resin films that are distributed in a roll state, the longitudinal direction is the MD direction, and the width direction is the TD direction. In resin films that are distributed in a rectangular shape or a square shape, a direction in which a certain side extends is the MD direction, and a direction in which another side that is orthogonal to the above-described side extends is the TD direction.

Normally, for a packaging material manufactured using a resin film, in a case where the shape of the packaging material seen in the normal direction to the resin film is rectangular or square, the combination of the MD direction and the TD direction regulated by the above-described guidelines matches the combination of the MD direction and the TD direction of the resin film used in the manufacturing. Therefore, in a case where the birefringence ΔN is measured using such a packaging material, the measurement may be performed based on the MD direction and the TD direction specified by the above-described guidelines.

In the inventors' studies, it was found that, when the birefringence ΔN of the base material 11 is 0 or more and 0.007 or less, the adhesion strength between the base material 11 on which the inorganic oxide layer 13 is provided and the heat seal layer 30 can be sufficiently ensured.

In the present specification, "the adhesion strength is sufficient" means that the lamination strength between the base material 11 and the heat seal layer 30 measured according to JIS K 6854 is 2 N or higher. In the laminate 1 according to the present embodiment, the adhesion strength between the base material 11 and the heat seal layer 30 has been sufficiently ensured, which will be described using examples below.

The birefringence ΔN exhibits a certain correlation with the degree of orientation of the resin film and exhibits a tendency that the value becomes small in unstretched films, but the birefringence ΔN of an extremely small number of stretched films is also within the above-described numerical range. That is, the birefringence ΔN is a parameter independent of whether a resin film is stretched or unstretched, which is an ordinary differentiation, and the relationship with the adhesion strength between the base material 11 and the heat seal layer 30 using the birefringence ΔN as a parameter was found by the inventors for the first time.

An example of the manufacturing sequence of the gas barrier film 10 and the laminate 1 will be described.

First, the base material 11 having a birefringence ΔN of 0 or more and 0.007 or less is selected. The base material 11 may be a commercially available product or may be manufactured by a well-known method.

The base material 11 may be a plurality of resin films attached together. In this case, when the birefringence ΔN of all of the plurality of resin films is 0 or more and 0.007 or less, it is possible to hold the interlayer joint strength of the base material high, which is preferable.

Next, the undercoat layer 12 (as necessary) and the inorganic oxide layer 13 are formed on the base material 11.

In a case where the undercoat layer 12 is formed, the undercoat layer may be formed by, for example, applying a liquid mixture for forming the undercoat layer 12 to the first surface 11*a* to form a coating film and drying the coating film (removing a solvent).

As a method for applying the liquid mixture, a well-known wet coating method can be used. As the wet coating method, a roll coating method, a gravure coating method, a reverse coating method, a die coating method, a screen printing method, a spray coating method and the like are exemplary examples.

As a method for drying the coating film made of the liquid mixture, well-known drying methods such as hot air drying, hot roll drying and infrared irradiation can be used. The drying temperature of the coating film can be set, for example, within a range of 50° C. to 200° C. The drying time varies with the thickness of the coating film, the drying temperature or the like and can be set to, for example, one second to five minutes.

The inorganic oxide layer 13 can be formed by the above-described vacuum deposition method, sputtering method, ion plating method or plasma vapor deposition method (CVD).

The overcoat layer 14 is formed on the inorganic oxide layer 13 as necessary. The overcoat layer 14 can be formed by, for example, applying a liquid mixture for forming the overcoat layer 14 to form a coating film and drying the coating film.

As a method for applying the liquid mixture and a method for drying the liquid mixture, it is possible to use the same methods as the methods exemplified in the description of the step of forming the undercoat layer 12.

The overcoat layer 14 may be formed by application and drying once or may be formed by repeating the application and drying of a homogeneous liquid mixture or a heterogeneous liquid mixture a plurality of times.

In the laminate 1, a printed layer, a protective layer, a light-shielding layer, other functional layers and the like may be further provided as necessary.

The printed layer can be provided at a position where the printed layer is visible from outside in a laminate or packaging material state for the purpose of displaying information regarding contents, identifying the contents or improving the design of packaging bags. A printing method and a printing ink are not particularly limited and can be selected from well-known printing methods and printing inks as appropriate in consideration of printability to films, designability such as color tone, adhesion, safety as food containers or the like.

As the printing method, for example, a gravure printing method, an offset printing method, a gravure offset printing method, a flexographic printing method, an inkjet printing method and the like are exemplary examples. Among these, the gravure printing method is preferable from the viewpoint of the productivity or high definition of patterns. In order to enhance the adhesion of the printed layer, a variety of pretreatments such as a corona treatment, a plasma treatment and a frame treatment may be performed or a coating layer such as an easy adhesive layer may be provided on the surface of a layer on which the printed layer is to be formed.

The printed layer can be provided between the inorganic oxide layer and the adhesive layer, between the overcoat layer and the adhesive layer or the like. Furthermore, as described below, in a case where the base material 11 is configured as a plurality of layers, the printed layer may be provided in the base material 11.

The gas barrier film of the present embodiment will be further described using examples and comparative examples. The present invention is not limited by the specific contents of the examples and the comparative examples.

Resin films used as base materials of the examples and the comparative examples will be described.

α1: Unstretched polyethylene film (thickness: 32 μm, density: 0.950 g/cm³, corona treatment on a single surface)

α2: Unstretched polyethylene film (thickness: 25 μm, density: 0.952 g/cm³, corona treatment on a single surface)

α3: Uniaxially stretched polyethylene film (thickness: 25 μm, density: 0.950 g/cm³, corona treatment on a single surface)

α4: Biaxially stretched polyethylene film (thickness: 25 μm, density: 0.950 g/cm³, corona treatment on a single surface)

(Preparation of Liquid Mixture for Undercoat Layer)

An acrylic polyol and a torylene diisocyanate were mixed so that the number of NCO groups in the torylene diisocyanate became equivalent to the number of OH groups in the acrylic polyol and diluted with ethyl acetate so that the total solid content (the total amount of the acrylic polyol and the torylene diisocyanate) reached 5 mass %. Furthermore, β(3,4 epoxycyclohexyl)trimethoxysilane was added thereto so that the content thereof reached 5 parts by mass with respect to the total amount of the acrylic polyol and the torylene diisocyanate that was 100 parts by mass and mixed therewith.

A liquid mixture for an undercoat layer was obtained as described above.

(Preparation of Liquid Mixture for Overcoat Layer)

An "A" liquid, a "B" liquid and a "C" liquid shown below were each mixed together so that the mass fractions reached 70:20:10, thereby obtaining a liquid mixture for an overcoat layer.

"A" liquid: A hydrolysis solution having a solid content of 5 mass % ($SiO_2$-equivalent) obtained by adding 17.9 g of tetraethoxysilane ($Si(OC_2H_5)_4$) and 10 g of methanol to 72.1 g of 0.1 N hydrochloric acid and hydrolyzing them by stirring for 30 minutes "B" liquid: A 5 mass % water/methanol solution (the mass ratio between water and methanol was 95:5) of a polyvinyl alcohol "C" liquid: A hydrolysis solution obtained by diluting 1,3,5-tris(3-trimethoxysilylpropyl)isocyanurate to a solid content of 5 mass % with a liquid mixture of water and isopropyl alcohol (the mass ratio between water and isopropyl alcohol was 1:1)

Two kinds of adhesives used in adhesive layers will be described below.

(Urethane-Based Adhesive)

Adhesive obtained by mixing 11 parts by mass of TAKA-NATE A52 manufactured by Mitsui Chemicals, Inc. and 84 parts by mass of ethyl acetate with 100 parts by mass of TAKELAC A525 manufactured by Mitsui Chemicals, Inc.

(Gas Barrier Adhesive)

Adhesive obtained by mixing 16 parts by mass of MAXIVE C93T manufactured by Mitsubishi Gas Chemical Company, Inc. and 5 parts by mass of MAXIVE M-100 manufactured by Mitsubishi Gas Chemical Company, Inc. with 23 parts by mass of a solvent obtained by mixing ethyl acetate and methanol in a mass ratio of 1:1.

Materials of each configuration used in the examples and the comparative examples are shown in Table 1.

Example 1-1

As a base material, the resin film α1 was used. The liquid mixture for an undercoat layer was applied to the corona-treated surface (first surface) of the base material by a gravure coating method, dried and cured, thereby forming an undercoat layer having an application amount of 0.1 g/m².

Next, a 30 nm-thick transparent inorganic oxide layer (silica-deposited film) made of silicon oxide was formed on the undercoat layer with a vacuum deposition device by an electron beam heating method. The O/Si ratio of the inorganic oxide layer was set to 1.8.

Furthermore, the liquid mixture for an overcoat layer was applied onto the inorganic oxide layer by the gravure coating method, dried and cured, thereby forming an overcoat layer having a thickness of 0.3 μm.

A gas barrier film according to Example 1-1 was thus obtained.

The urethan-based adhesive was applied by the gravure coating method and dried on the overcoat layer of the gas barrier film according to Example 1-1, thereby forming an adhesive layer having a thickness of 3 μm. A 60 μm-thick unstretched film made of LLDPE (manufactured by Mitsui Chemicals Tohcello, Inc., trade name: TUX-MCS) was attached to this adhesive layer by dry lamination as a heat seal layer. After that, etching was performed at 40° C. for four days. Therefore, a laminate according to Example 1-1 was obtained.

Example 1-2

A gas barrier film and a laminate according to Example 1-2 were obtained by the same procedure as in Example 1-1 except that the resin film α2 was used as a base material.

Example 1-3

A gas barrier film according to Example 1-3 was obtained by the same procedure as in Example 1-1 except that the overcoat layer was not provided. The gas barrier adhesive was applied by a gravure coating method and dried on the inorganic oxide layer of the gas barrier film according to Example 1-3, thereby forming an adhesive layer having a thickness of 3 μm. A 60 μm-thick unstretched film made of LLDPE (manufactured by Mitsui Chemicals Tohcello, Inc., trade name: TUX-MCS) was attached to this adhesive layer by dry lamination as a heat seal layer. After that, etching was performed at 40° C. for four days. Therefore, a laminate according to Example 1-3 was obtained.

Example 1-4

A gas barrier film and a laminate according to Example 1-4 were obtained by the same procedure as in Example 1-3 except that the resin film α2 was used as a base material.

Example 1-5

A pattern was printed on one surface of the resin film α1 by a gravure printing method to provide a printed layer. The urethane-based adhesive was applied onto the printed layer to obtain a first film. Furthermore, the first film was attached to a surface on which no inorganic oxide layer was provided (second surface) in the base material of the gas barrier film according to Example 1-1 by dry lamination, thereby producing a gas barrier film according to Example 1-5. That is, the printed resin film α1 was attached to the laminate according to Example 1-1 to produce a laminate according to Example 1-5.

Figure 2:
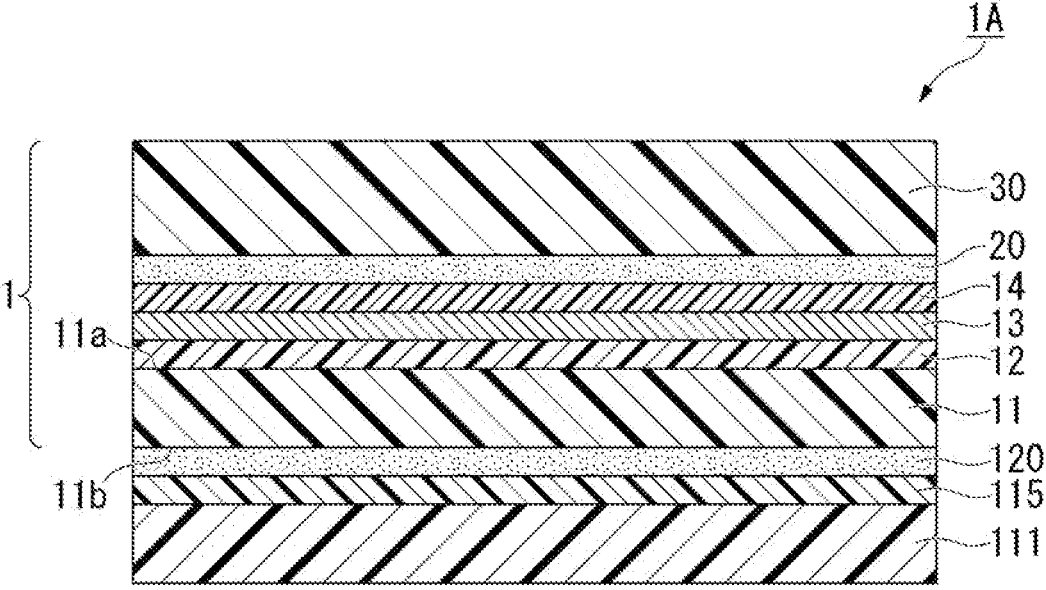
FIG. 2 is a schematic cross-sectional view of a laminate according to an example of the first embodiment.

The layer configuration of the laminate according to Example 1-5 is shown in FIG. 2. The base material of a laminate 1A shown in FIG. 2 is configured by joining a first polyethylene film 111 having a printed layer 115 to a second surface 11b of a base material 11 with an adhesive layer 120. That is, the base material according to Example 1-5 has a configuration where two polyethylene layers are joined together with an adhesive layer.

Example 1-6

A gas barrier film and a laminate according to Example 1-6 were obtained by the same procedure as in Example 1-5 except that the gas barrier film and the laminate according to Example 1-3 were used as a laminate that was attached to a first film.

Example 1-7

A gas barrier film and a laminate according to Example 1-7 were obtained by the same procedure as in Example 1-6 except that the undercoat layer was not provided.

Example 1-8

A gas barrier film and a laminate according to Example 1-8 were obtained by the same procedure as in Example 1-3 except that the undercoat layer and the overcoat layer were not provided.

Comparative Example 1-1

A gas barrier film and a laminate according to Comparative Example 1-1 were obtained by the same procedure as in Example 1-1 except that the resin film α3 was used as a base material.

Comparative Example 1-2

A gas barrier film and a laminate according to Comparative Example 1-2 were obtained by the same procedure as in Example 1-3 except that the resin film α3 was used as a base material.

Comparative Example 1-3

A gas barrier film and a laminate according to Comparative Example 1-3 were obtained by the same procedure as in Example 1-3 except that the resin film α4 was used as a base material.

following measurement conditions. For all of the base materials, the corona-treated surfaces were measured.

Device: Phase difference measuring instrument (manufactured by Oji Scientific Instruments: KOBRA-WR)

Light source wavelength: 586.6 nm

Measurement method: Parallel Nicole rotation method, direct measurement (Recyclability)

The proportion (wt %) of the polyethylene in the laminate of each example was calculated based on the following formula (1).

$$(\text{Mass of resin film } \alpha1 \text{ to } \alpha4 \text{ used+mass of heat seal} \\ \text{layer})/\text{mass of entire laminate} \times 100 \tag{1}$$

Evaluation was performed based on the following two levels.

O (good): The proportion of the polyethylene in the laminate is 90 mass % or more.

X (bad): The proportion of the polyethylene in the laminate is less than 90 mass %.

(Lamination Strength Between Base Material and Heat Seal Layer)

According to JIS Z 1707, a 15 mm-wide strip-like test piece was cut out from the laminate of each example, and the lamination strength between the base material and the heat seal layer was measured using a TENSILON universal testing instrument RTC-1250 manufactured by A&D Manufacturing Company, Limited. The following two conditions were set.

T-type peeling Normal ("Dry T" in Table 1)

T-type peeling Measurement portion wet ("Wet T" in Table 1)

(Oxygen Transmission Rate: OTR)

The laminate of each example was measured by a MOCON method under conditions of 30° and 70% RH (relative humidity).

(Water Vapor Transmission Rate: WVTR)

The laminate of each example was measured by the MOCON method under conditions of 40° and 90% RH.

The results are shown in Table 1.

TABLE 1

| | | | | | Recyclability | | | | | |
| | Layer configuration | | | bire- | Polyethylene | | Lamination | | OTR | |
| | Base | Overcoat | Adhesive | fringence | proportion | Evalu- | strength (N) | | (cc/m² · | WVTR |
| | material | layer | layer | ΔN | (wt %) | ation | Dry T | Wet T | day · atm) | (g/m² · day) |
|---|---|---|---|---|---|---|---|---|---|---|
| Example 1-1 | α1 | Present | Urethane-based adhesive | 0.0029 | 97.2 | O | >5 | >5 | 2.8 | 1.5 |
| Example 1-2 | α2 | Present | Urethane-based adhesive | 0.0051 | 96.9 | O | >5 | >5 | 2.6 | 1.5 |
| Example 1-3 | α1 | Absent | Gas barrier adhesive | 0.0029 | 97.6 | O | >5 | >5 | 0.4 | 0.6 |
| Example 1-4 | α2 | Absent | Gas barrier adhesive | 0.0051 | 97.4 | O | >5 | >5 | 0.5 | 0.6 |
| Example 1-5 | α1 two layers | Present | Urethane-based adhesive | 0.0029 | 96.3 | O | >5 | >5 | 2.5 | 1.1 |
| Example 1-6 | α1 two layers | Absent | Gas barrier adhesive | 0.0029 | 96.6 | O | >5 | >5 | 0.3 | 0.4 |
| Example 1-7 | α1 two layers | Absent | Gas barrier adhesive | 0.0029 | 96.7 | O | >5 | >5 | 1.2 | 1.6 |
| Example 1-8 | α1 | Absent | Gas barrier adhesive | 0.0029 | 97.7 | O | >5 | >5 | 0.8 | 1.9 |
| Comparative Example 1-1 | α3 | Present | Urethane-based adhesive | 0.0421 | 96.9 | O | 1.7 | 1.7 | 1.3 | 0.9 |
| Comparative Example 1-2 | α3 | Absent | Gas barrier adhesive | 0.0421 | 97.4 | O | 1.7 | 1.7 | 0.2 | 0.2 |
| Comparative Example 1-3 | α4 | Present | Gas barrier adhesive | 0.0119 | 97.4 | O | 1.2 | 1.2 | 0.5 | 0.7 |

The following items were evaluated using the gas barrier films and the laminates of the examples and the comparative examples.

(Measurement of Birefringence ΔN of Base Material)

Before the production of the gas barrier films, the birefringence ΔN of the base materials was calculated under the In all of the examples, the recyclability was favorable, and the adhesion strengths between the base material and the heat seal layer were also sufficient. Particularly, it is found that, in the examples, the birefringence ΔN was 0.0029 or more and 0.007 or less and the lamination strengths were sufficient. In addition, all of the examples exhibited a favorable gas barrier property, especially, Examples 1-3, 1-4 and 1-6 where the gas barrier adhesive was used were particularly excellent in terms of the gas barrier property.

On the other hand, in each comparative example, while the recyclability was favorable, the adhesion strength between the base material and the heat seal layer was not sufficient, and there was a concern that delamination, bag breakage or the like might occur depending on the use or the like.

Second Embodiment

Hereinafter, a second embodiment of the present invention will be described with reference to FIG. 3. The basic configuration is the same as in the first embodiment. Therefore, there will be cases where the same configuration will be given the same reference sign and will not be described again and only differences will be described.

Figure 3:
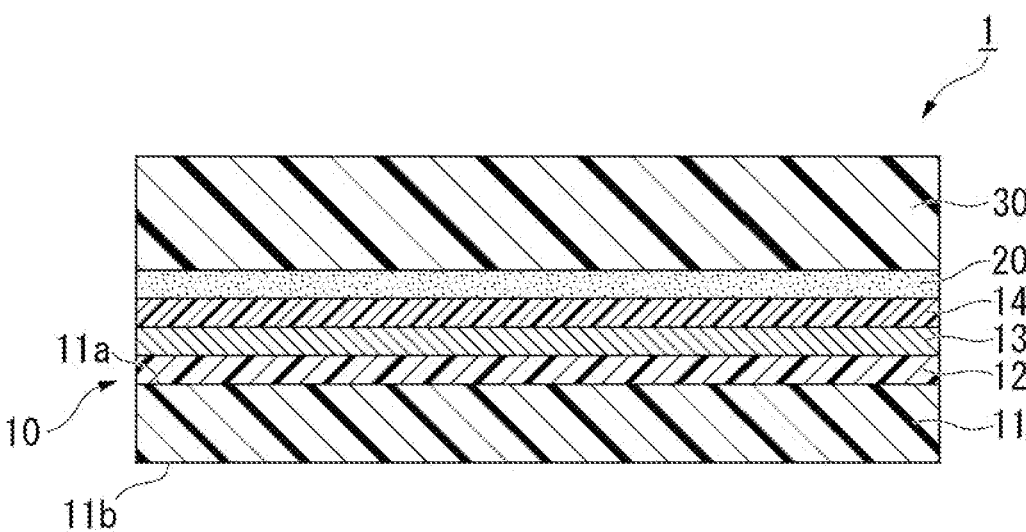
FIG. 3 is a schematic cross-sectional view of a laminate according to a second embodiment of the present invention.

FIG. 3 is a schematic cross-sectional view of a laminate 1 according to the present embodiment. The laminate 1 includes a gas barrier film 10 and a heat seal layer 30. The gas barrier film 10 of the present embodiment is one aspect of a gas barrier film according to the present invention.

The gas barrier film 10 and the heat seal layer 30 are joined together through an adhesive layer 20.

The proportion of a polyethylene in the laminate 1 is 90 mass % or more. This makes the laminate 1 be composed of a highly recyclable mono-material.

The gas barrier film 10 includes a sheet-like base material 11 and an undercoat layer 12, an inorganic oxide layer 13 and an overcoat layer 14 sequentially formed on a first surface 11a of the base material 11.

The proportion of a polyethylene in the gas barrier film 10 is 90 mass % or more. This makes the gas barrier film 10 be composed of a highly recyclable mono-material.

Hereinafter, each configuration of the gas barrier film 10 will be described.

The base material 11 contains a polyethylene (PE). The base material 11 may contain a polyethylene alone as a resin component. The base material 11 may be any of a single-layer film composed of a single resin or a single-layer or laminate film for which a plurality of resins is used. In addition, a resin containing PE may be laminated on a different base material (metal, wood, paper, ceramics or the like). That is, the base material 11 may be a single layer or may be two or more layers.

The base material 11 may be an unstretched film or may be a stretched (uniaxially or biaxially stretched) film.

The density of PE in the base material 11 is preferably 0.935 or higher and more preferably 0.940 or higher. When the density of PE is within the above-described range, it is easy to suppress the elongation of the base material 11 during rolling and the consequent formation of wrinkles, and it is easy to suppress the generation of cracks in the inorganic oxide layer 13.

PE may be at least one polymer selected from a homopolymer, a random copolymer and a block copolymer. The homopolymer is a polyethylene made of polyethylene alone. The random copolymer is a polyethylene in which ethylene, which is a main monomer, and a small amount of a comonomer that is different from the ethylene (for example, an α-olefin) randomly copolymerize and form a homogeneous phase. The block copolymer is a polyethylene in which ethylene, which is a main monomer, and the above-described copolymer (for example, an α-olefin) block-copolymerize or polymerize into a rubber form and thereby form a heterogeneous phase.

The base material 11 may be a multilayer configuration including a plurality of layers (films) each containing PE having a different density. It is desirable to configure the base material 11 to include multiple layers as appropriate in consideration of the processability, stiffness or bending stiffness and heat resistance of a film configuring each layer, powder falling during conveyance or the like. The films that configure the base material 11 can be produced by appropriately selecting and using a high-density polyolefin, a medium-density polyolefin, a low-density polyolefin or the like. Even in this case, the density is preferably 0.935 or higher when the density is measured for the entire base material 11.

Each layer of the base material 11 may contain a slip agent, an antistatic agent or the like, and the content or content rate thereof may vary with each layer. The base material 11 including a plurality of layers can be produced by extrusion coating, co-extrusion coating, sheet forming, co-extrusion blow forming or the like.

On the first surface 11a of the base material 11, a surface treatment such as a chemical treatment, a solvent treatment, a corona treatment, a low-temperature plasma treatment or an ozone treatment may be performed to improve the adhesiveness to the undercoat layer 12 or the inorganic oxide layer 13. Furthermore, the same surface treatment may also be performed on a second surface 11b on the opposite side to the first surface 11a for the purpose of attachment to a printed base material.

The base material 11 may contain an additive such as a filler, an anti-blocking agent, an antistatic agent, a plasticizer, a lubricant or an antioxidant. Any one of these additives may be used singly or two or more additives may be jointly used.

The thickness of the base material 11 is not particularly limited and can be determined as appropriate depending on the price or the use in consideration of the suitability as a packaging material or the lamination suitability of other membranes. The thickness of the base material 11 is, practically, preferably within a range of 3 μm to 200 μm, more preferably within a range of 5 μm to 120 μm, still more preferably within a range of 6 μm to 100 μm and particularly preferably within a range of 10 μm to 40 μm.

(Undercoat Layer 12)

The undercoat layer 12 is a layer containing an organic polymer as a main component and is referred to as a primer layer in some cases. The undercoat layer 12 provided makes it possible to improve the film formation property or adhesion strength of the inorganic oxide layer 13.

The amount of the organic polymer in the undercoat layer 12 may be, for example, 70 mass % or more and 80 mass % or more. As the organic polymer, a polyacrylic resin, a polyester resin, a polycarbonate resin, a polyurethane resin, a polyamide resin, a polyolefin resin, a polyimide resin, a melamine resin, a phenolic resin and the like are exemplary examples. When the hydrolysis resistance of the adhesion strength between the base material 11 and the inorganic oxide layer 13 is taken into account, the undercoat layer 12 preferably contains, among the above-described organic polymers, at least one of a polyacrylic resin, a polyol-based resin, a polyurethane-based resin, a polyamide-based resin or a reaction product of this organic polymer.

The undercoat layer 12 may contain a silane coupling agent, organic titanate, modified silicone oil or the like.

As the organic polymer that is used in the undercoat layer 12, an organic polymer having a urethane bond generated by a reaction between a polyol having two or more hydroxyl groups at a polymer end and an isocyanate compound or an organic polymer containing a reaction product of a polyol having two or more hydroxyl groups at a polymer end and an organic silane compound such as a silane coupling agent or a hydrolyzate thereof is more preferable. One of these may be used or both may be used.

As the polyol, for example, at least one selected from an acrylic polyol, a polyvinyl acetal, a polystyrene polyol, a polyurethane polyol and the like is an exemplary example. The acrylic polyol may be an organic polymer that is obtained by polymerizing an acrylic acid derivative monomer or may be an organic polymer that is obtained by copolymerizing an acrylic acid derivative monomer and a different monomer. As the acrylic acid derivative monomer, ethyl methacrylate, hydroxyethyl methacrylate, hydroxypropyl methacrylate, hydroxybutyl methacrylate and the like are exemplary examples. As the monomer that is copolymerized with the acrylic acid derivative monomer, styrene and the like are exemplary examples.

The isocyanate compound has an action of enhancing the adhesion between the base material 11 and the inorganic oxide layer 13 by a urethane bond that is generated by a reaction with the polyol. That is, the isocyanate compound functions as a crosslinking agent or a curing agent. As the isocyanate compound, for example, monomers such as aromatic tolylene diisocyanate (TDI), diphenylmethane diisocyanate (MDI), aliphatic xylene diisocyanate (XDI), hexamethylene diisocyanate (HMDI), and isophorone diisocyanate (IPDI), polymers thereof and derivatives thereof are exemplary examples. The above-described isocyanate compounds may be used singly or two or more isocyanate compounds may be combined.

As the silane coupling agent, for example, vinyltrimethoxysilane, γ-chloropropylmethyldimethoxysilane, γ-chloropropyltrimethoxysilane, glycidoxypropyltrimethoxysilane, γ-methacryloxypropyltrimethoxysilane, γ-methacryloxypropylmethyldimethoxysilane and the like are exemplary examples. The organic silane compound may be a hydrolyzate of one of these silane coupling agents. As the organic silane compound, one of the above-described silane coupling agents and hydrolyzates thereof may be used singly or a combination of two or more may be contained.

The undercoat layer 12 can be formed using a liquid mixture obtained by blending the above-described component with an organic solvent in an arbitrary proportion. The liquid mixture may contain, for example, a curing accelerator such as a tertiary amine, an imidazole derivative, a metal salt compound of a carboxylic acid, a quaternary ammonium salt or a quaternary phosphonium salt; a phenolic, sulfur-based, phosphite-based or other antioxidant; a leveling agent; a flow control agent; a catalyst; a cross-linking reaction accelerator; a filler or the like.

The liquid mixture can be disposed on the base material 11 in layers using a well-known printing method such as an offset printing method, a gravure printing method, or a silk screen printing method or a well-known application method such as roll coating, knife edge coating, or gravure coating. The disposed mixed liquid is heated, for example, to 50° C. to 200° C., whereby the undercoat layer 12 can be formed.

The thickness of the undercoat layer 12 is not particularly limited and may be set within a range of, for example, 0.005 to 5 μm. The thickness can be determined as appropriate depending on the use or required characteristics. The thickness of the undercoat layer 12 is preferably within a range of 0.01 to 1 μm and more preferably within a range of 0.01 to 0.5 μm). When the thickness of the undercoat layer 12 is 0.01 μm or more, a sufficient adhesion strength can be obtained between the base material 11 and the inorganic oxide layer 13, and the oxygen barrier property also becomes favorable. When the thickness of the undercoat layer 12 is 1 μm or less, it is easy to form a uniform coated surface, and the dry load or the manufacturing cost can be suppressed.

(Inorganic Oxide Layer 13)

As an inorganic oxide that configures the inorganic oxide layer 13, aluminum oxide, silicon oxide, magnesium oxide, titanium oxide, tin oxide, zinc oxide, indium oxide and the like are exemplary examples. Particularly, the inorganic oxide layer 13 may be composed of aluminum oxide or silicon oxide. Aluminum oxide or silicon oxide is preferable since the productivity is excellent, and the heat-resistant or wet and heat-resistant oxygen barrier property and water vapor barrier property are excellent. The inorganic oxide layer 13 may be formed of one inorganic oxide or may be formed of two or more appropriately-selected inorganic oxides.

The thickness of the inorganic oxide layer 13 can be set to 1 nm or more and 200 nm or less. When the thickness is 1 nm or more, an excellent oxygen barrier property and an excellent water vapor barrier property can be obtained. When the thickness is 200 nm or less, the manufacturing cost can be suppressed at a low level, cracks are less likely to be generated due to an external force such as bending or pulling, and the deterioration of the barrier property can be suppressed.

The inorganic oxide layer 13 can be formed by, for example, a well-known film formation method such as a vacuum deposition method, a sputtering method, an ion plating method or a plasma vapor deposition method (CVD).

(Overcoat Layer 14)

The overcoat layer 14 may be a well-known oxygen barrier membrane that is formed by a wet coating method. The overcoat layer is an optional configuration and may not be provided.

The overcoat layer 14 can be obtained by forming a coating film made of a coating agent by a wet coating method on any layer of the base material 11, the undercoat layer 12 and the inorganic oxide layer 13 and drying this coating film. In the present specification, "coating film" means a wet film, and "membrane" means a dry film, respectively.

As the overcoat layer 14, a membrane containing at least one of a metal alkoxide and a hydrolyzate thereof or a reaction product thereof and a water-soluble polymer (hereinafter, referred to as "organic inorganic composite membrane" in some cases) may be included. Furthermore, at least one of a silane coupling agent and a hydrolyzate thereof is preferably further contained.

As the metal alkoxide and the hydrolyzate thereof in the organic inorganic composite membrane, for example, compounds represented by a general formula $M(OR)_n$ such as tetraethoxysilane $[Si(OC_2H_5)_4]$ and aluminum triisopropoxide $[Al(OC_3H_7)_3]$ and hydrolyzates thereof are exemplary examples. Only one of these may be contained or two or more may be appropriately combined and contained.

The total amount of at least one of the metal alkoxide and the hydrolyzate thereof or the reaction product thereof in the organic inorganic composite membrane is, for example, within a range of 40 to 70 mass %. From the viewpoint of further reducing the oxygen transmission rate, the lower limit of the total amount may be 50 mass %, and the upper limit of the total amount may be 65 mass %.

The water-soluble polymer in the organic inorganic composite membrane is not particularly limited, and, for example, polysaccharides such as polyvinyl alcohol-based polysaccharides and starch/methylcellulose/carboxymethyl-cellulose and a variety of polymers such as acrylic polyol-based polymers are exemplary examples. From the view-point of further improving the oxygen gas barrier property, a polyvinyl alcohol-based polymer is preferably contained. The number-average molecular weight of the water-soluble polymer is, for example, within a range of 40000 to 180000.

The polyvinyl alcohol-based water-soluble polymer can be obtained by, for example, saponifying (or partially saponifying) polyvinyl acetate. In this water-soluble poly-mer, several tens of percents of an acetic acid group may remain or only several percents of an acetic acid group may remain.

The amount of the water-soluble polymer in the organic inorganic composite membrane is, for example, within a range of 15 to 50 mass %. When the amount of the water-soluble polymer is within a range of 20 to 45 mass %, the oxygen transmission rate of the organic inorganic com-posite film can be further reduced, which is preferable.

As the silane coupling agent and the hydrolyzate thereof in the organic inorganic composite membrane, silane cou-pling agents having an organic functional group are exem-plary examples. As such a silane coupling agent and such a hydrolyzate thereof, ethyltrimethoxysilane, vinyltrimethox-ysilane, γ-chloropropylmethyldimethoxysilane, γ-chloropro-pyltrimethoxysilane, glycidoxypropyltrimethoxysilane, γ-methacryloxypropyltrimethoxysilane, γ-methacryloxypro-pylmethyldimethoxysilane and hydrolyzates thereof are exemplary examples. Only one of these may be contained or two or more may be appropriately combined and contained.

As at least one of the silane coupling agent and the hydrolyzate thereof, a silane coupling agent or hydrolyzate thereof having an epoxy group as the organic functional group is preferably used. As the silane coupling agent having an epoxy group, for example, γ-glycidoxypropyltrimethox-ysilane and β-(3,4-epoxycyclohexyl)ethyltrimethoxysilane are exemplary examples. The silane coupling agent or hydrolyzate thereof having an epoxy group may also have another organic functional group that is different from the epoxy group such as a vinyl group, an amino group, a methacrylic group or an ureyl group.

The silane coupling agent and hydrolyzate thereof having an organic functional group are capable of further improving the oxygen barrier property of the overcoat layer 14 and the adhesion to the undercoat layer 12 or the inorganic oxide layer 13 by the interaction between the organic functional group and the hydroxyl group of the water-soluble polymer. In particular, the epoxy group of the silane coupling agent or the hydrolyzate thereof and the hydroxyl group of a poly-vinyl alcohol are capable of configuring the overcoat layer 14 being particularly excellent in terms of an oxygen barrier property and adhesion by the interaction.

The total amount of at least one of the silane coupling agent and the hydrolyzate thereof or the reaction product thereof in the organic inorganic composite membrane is, for example, within a range of 1 to 15 mass %. When the total amount of at least one of the silane coupling agent and the hydrolyzate thereof or the reaction product thereof is within a range of 2 to 12 mass %, the oxygen transmission rate of the organic inorganic composite membrane can be further reduced, which is preferable.

The organic inorganic composite membrane may contain a crystalline inorganic layered compound having a layer structure. As the inorganic layered compound, for example, clay minerals represented by the kaolinite group, the smec-tite group, the mica group or the like are exemplary examples. These can be used singly or two or more can be appropriately combined and used. The particle diameters of the inorganic layered compound are, for example, within a range of 0.1 to 10 μm. The aspect ratios of the inorganic layered compound are, for example, within a range of 50 to 5000.

As the inorganic layered compound, a clay mineral from the smectite group is preferable since a membrane having an excellent oxygen barrier property and an excellent adhesion strength can be formed by the intercalation of the water-soluble polymer between the layers of the layer structure. Specific examples of the clay mineral from the smectite group include montmorillonite, hectorite, saponite, water-swellable synthetic mica and the like. In a case where water-swellable synthetic mica is contained in the overcoat layer 14, when a hydrothermal treatment such as a boiling treatment is performed on the film, the layer structure of the water-swellable synthetic mica collapses, and consequently, there are cases where an expected function is not sufficiently exhibited. Therefore, the gas barrier film 10 may be config-ured not to include the oxygen barrier membrane containing water-swellable synthetic mica.

The thickness of the overcoat layer 14 is set depending on a required oxygen barrier property, can be set, for example, within a range of 0.05 to 5 μm and is preferably within a range of 0.05 to 1 μm and more preferably within a range of 0.1 to 0.5 μm. When the thickness of the overcoat layer 14 is 0.05 μm or more, it is easy to obtain a sufficient oxygen barrier property. When the thickness of the overcoat layer 14 is 1 μm or less, it is easy to form a uniform coated surface, and the dry load or the manufacturing cost can be sup-pressed.

The overcoat layer 14 made of the organic inorganic composite membrane exhibits an excellent oxygen barrier property even after a boiling treatment or a retort steriliza-tion treatment. The laminate 1 having a sealant film joined to the gas barrier film 10 has a sufficient adhesion strength or seal strength as a packaging material for a boiling or retort treatment and, furthermore, has both transparency and bend-ing resistance or stretching resistance that metal foils or metal-deposited films do not have. Furthermore, the lami-nate has an advantage of no risk of the generation of a hazardous substance such as dioxin.

(Adhesive Layer 20)

A well-known adhesive for dry lamination may be used as the adhesive layer 20. Adhesives can be used with no particular limitations as long as the adhesives are for dry lamination, and specific examples include two-liquid cur-able ester-based adhesives, ether-based adhesives, urethane-based adhesives and the like.

A gas barrier adhesive that exhibits a gas barrier property after curing may also be used as the adhesive layer 20. The use of the gas barrier adhesive makes it possible to improve the gas barrier property of the laminate 1. The oxygen transmission rate of the gas barrier adhesive is preferably 150 cc/m$^2$·day·atm or less, more preferably 100 cc/m$^2$·day·atm or less, still more preferably 80 cc/m$^2$·day·atm or less and particularly preferably 50 cc/m$^2$·day·atm or less. When the oxygen transmission rate is within the above-described range, it is possible to suffi-ciently improve the gas barrier property of the laminate 1, and, even when minor cracks or the like are generated in the inorganic oxide layer 13 or the overcoat layer 14, the gas barrier adhesive enters gaps therebetween, which makes it possible to suppress the degradation of the gas barrier property.

As the gas barrier adhesive, an epoxy-based adhesive, a polyester/polyurethane-based adhesive and the like are exemplary examples. Specific examples of the gas barrier adhesive include "MAXIVE" manufactured by Mitsubishi Gas Chemical Company, Inc., "Paslim" manufactured by DIC Corporation and the like.

In a case where the adhesive layer 20 is made of a gas barrier adhesive, the thickness of the adhesive layer 20 is preferably 50 times or more the thickness of the inorganic oxide layer 13. When the thickness is within the above-described range, it is possible to more sufficiently suppress the cracking of the inorganic oxide layer 13 and to further improve the gas barrier property of the laminate 1. Furthermore, it is possible to impart a cushioning property, which relaxes external impact, to the adhesive layer 20 and to prevent the cracking of the inorganic oxide layer 13 attributed to the impact. The thickness of the adhesive layer 20 is preferably 300 times or less the thickness of the inorganic oxide layer 13 from the viewpoint of the maintaining of the flexibility of the laminate 1, processability and the cost.

When indicated by a numerical value, such a thickness of the adhesive layer 20 is, for example, within a range of 0.1 to 20 μm, preferably within a range of 0.5 to 10 μm and more preferably within a range of 1 to 5 μm.

The adhesive forming the adhesive layer 20 can be applied by, for example, a bar coating method, a dipping method, a roll coating method, a gravure coating method, a reverse coating method, an air knife coating method, a comma coating method, a die coating method, a screen printing method, a spray coating method, a gravure offset method or the like. The temperature at the time of drying the coating film of the adhesive can be set, for example, within a range of 30° C. to 200° C. and is preferably within a range of 50° C. to 180° C. The temperature at the time of curing the coating film can be set, for example, within a range of room temperature to 70° C. and is preferably within a range of 30° C. to 60° C. When the temperatures during the drying and the curing are set within the above-described ranges, it is possible to further suppress the generation of cracks in the inorganic oxide layer 13 or the adhesive layer 20 and to develop an excellent gas barrier property.

From the viewpoint of preventing the cracking of the inorganic oxide layer 13, the adhesive layer 20 and the inorganic oxide layer 13 are preferably in direct contact with each other, but there may be another layer between the adhesive layer 20 and the inorganic oxide layer 13.

(Heat Seal Layer 30)

The heat seal layer 30 is a layer containing a polyolefin and functions as a sealant at the time of manufacturing packaging bags or the like using the laminate 1. A polyolefin film may be used as the heat seal layer 30. The use of a polyethylene film as the heat seal layer 30 makes it possible to make the laminate 1 into a mono-material. The heat seal layer 30 may contain only a polyethylene as a resin component.

As a polyolefin-based resin that is used for the heat seal layer 30, it is possible to use ethylene-based resins such as a low-density polyethylene resin (LDPE), a medium-density polyethylene resin (MDPE), a linear low-density polyethylene resin (LLDPE), an ethylene-vinyl acetate copolymer (EVA), an ethylene-α-olefin copolymer and an ethylene-(meth)acrylic acid copolymer, polypropylene-based resins such as a blended resin of polyethylene and polybutene, a homopolypropylene resin(PP), a propylene-ethylene random copolymer, a propylene-ethylene block copolymer and a propylene-α-olefin copolymer and the like. These thermoplastic resins can be selected as appropriate depending on the intended use or the temperature condition of a boiling treatment or the like.

To the heat seal layer 30, a variety of additives such as a flame retardant, a slip agent, an anti-blocking agent, an antioxidant, a light stabilizer and a tackifier may be added.

The thickness of the heat seal layer 30 can be set as appropriate in consideration of the shape of a packaging bag to be manufactured, the mass of contents to be accommodated or the like and may be set, for example, within a range of 30 to 150 μm.

In the case of manufacturing the laminate 1 including the adhesive layer 20 and the heat seal layer 30 using a polyolefin film, it is possible to apply any of a dry lamination method in which the heat seal layer is attached with an adhesive such as a one-liquid curable or two-liquid curable urethane-based adhesive and a non-solvent dry lamination method in which the heat seal layer is attached using a solventless adhesive.

As another method, it is also possible to form the heat seal layer 30 by an extrusion lamination method in which a thermoplastic resin is heated, melted, extruded in a curtain shape and attached or the like. In this case, the adhesive layer 20 may be omitted.

What has been described above is the basic configuration of the laminate 1. In the laminate 1, the inorganic oxide layer 13 is positioned between the base material 11 and the heat seal layer.

The gas barrier film 10 can be used for a variety of packaging bags requiring a gas barrier property even by itself; however, when one or a plurality of laminates each having the heat seal layer 30 provided on the gas barrier film 10 are prepared, and the fringes are thermally fused together with the heat seal layers 30 facing each other, it is possible to form a variety of packaging materials such as packaging bags and standing bags for which the laminate 1 is used.

As a result of a variety of studies regarding cases where the adhesion between the base material 11 containing a polyethylene and the heat seal layer 30 was not sufficient, the present inventors found that the adhesion changed due to the crystallinity of the base material 11. Specifically, it is found that, when the crystallinity of the base material is 35% or less, the base material favorably adheres to the heat seal layer. Based on this finding, the crystallinity of the base material 11 of the present embodiment is set to 35% or less.

The crystallinity of a resin film can be measured by an X-ray diffraction method (XRD). An X-ray diffraction pattern is obtained by performing 2θ/θ scanning in an out-of-plane mode of the X-ray diffraction method. In a case where the resin film is a polyethylene film, it is preferable to perform scanning at a diffraction angle within 10° to 30°. When scanning is performed within this range, two sharp crystal peaks corresponding to a PE (110) plane and a PE (200) plane and a broad amorphous peak (halo peak) are observed. When these three peaks are separately analyzed and the areas of the crystal peaks and the amorphous peak are calculated, the crystallinity is obtained from a formula (2).

$$\text{Crystallinity=crystal peak area/(crystal peak area+ amorphous peak area)} \quad (2)$$

Since the surface of the resin film is not flat and there is a possibility that deviation may occur on the measurement surface, a parallel beam method is preferably used.

In the inventors' studies, it was found that, when the crystallinity is 35% or less, the adhesion strength between the base material 11 provided with the inorganic oxide layer 13 and the heat seal layer 30 can be sufficiently ensured.

In the present specification, "the adhesion strength is sufficient" means that the lamination strength between the base material 11 and the heat seal layer 30 measured according to J1S K 6854 is 2 N or higher. In the laminate 1 according to the present embodiment, the adhesion strength between the base material 11 and the heat seal layer 30 has been sufficiently ensured, which will be described using examples below.

The crystallinity exhibits a certain correlation with the degree of orientation of the resin film and exhibits a tendency that the value becomes small in unstretched films, but the crystallinity of an extremely small number of biaxially stretched films is also within the above-described numerical range. That is, the crystallinity is a parameter independent of whether the resin film is stretched or unstretched, which is an ordinary differentiation, and the relationship of the adhesion strength between the base material 11 and the heat seal layer 30 using the crystallinity as a parameter was found by the inventors for the first time.

An example of the manufacturing sequence of the gas barrier film 10 and the laminate 1 will be described.

First, the base material 11 having a crystallinity of 35% or less is selected. The base material 11 may be a commercially available product or may be manufactured by a well-known method.

The base material 11 may be a plurality of resin films attached together. In this case, when the crystallinity of all of the plurality of resin films is 35% or less, it is possible to hold the interlayer joint strength of the base material high, which is preferable.

Next, the undercoat layer 12 (as necessary) and the inorganic oxide layer 13 are formed on the base material 11.

In a case where the undercoat layer 12 is formed, the undercoat layer may be formed by, for example, applying a liquid mixture for forming the undercoat layer 12 to the first surface 11a to form a coating film and drying the coating film (removing a solvent).

As a method for applying the liquid mixture, a well-known wet coating method can be used. As the wet coating method, a roll coating method, a gravure coating method, a reverse coating method, a die coating method, a screen printing method, a spray coating method and the like are exemplary examples.

As a method for drying the coating film made of the liquid mixture, well-known drying methods such as hot air drying, hot roll drying and infrared irradiation can be used. The drying temperature of the coating film can be set, for example, within a range of 50° C. to 200° C. The drying time varies with the thickness of the coating film, the drying temperature or the like and can be set to, for example, one second to five minutes.

The inorganic oxide layer 13 can be formed by the above-described vacuum deposition method, sputtering method, ion plating method or plasma vapor deposition method (CVD).

The overcoat layer 14 is formed on the inorganic oxide layer 13 as necessary.

The overcoat layer 14 can be formed by, for example, applying a liquid mixture for forming the overcoat layer 14 to form a coating film and drying the coating film.

As a method for applying the liquid mixture and a method for drying the liquid mixture, it is possible to the same methods as the methods exemplified in the description of the step of forming the undercoat layer 12.

The overcoat layer 14 may be formed by application and drying once or may be formed by repeating the application and drying of a homogeneous liquid mixture or a heterogeneous liquid mixture a plurality of times.

In the laminate 1, a printed layer, a protective layer, a light-shielding layer, other functional layers and the like may be further provided as necessary.

The printed layer can be provided at a position where the printed layer is visible from outside in a laminate or packaging material state for the purpose of displaying information regarding contents, identifying the contents or improving the design of packaging bags. A printing method and a printing ink are not particularly limited and can be selected from well-known printing methods and printing inks as appropriate in consideration of printability to films, designability such as color tone, adhesion, safety as food containers or the like.

As the printing method, for example, a gravure printing method, an offset printing method, a gravure offset printing method, a flexographic printing method, an inkjet printing method and the like are exemplary examples. Among these, the gravure printing method is preferable from the viewpoint of the productivity or high definition of patterns. In order to enhance the adhesion of the printed layer, a variety of pretreatments such as a corona treatment, a plasma treatment and a frame treatment may be performed or a coating layer such as an easy adhesive layer may be provided on the surface of a layer on which the printed layer is to be formed.

The printed layer can be provided between the inorganic oxide layer and the adhesive layer, between the overcoat layer and the adhesive layer or the like.

Furthermore, as described below, in a case where the base material 11 is configured as a plurality of layers, the printed layer may be provided in the base material 11.

The gas barrier film of the present embodiment will be further described using examples and comparative examples. The present invention is not limited by the specific amounts in the examples and the comparative examples.

Resin films used as base materials of the examples and the comparative examples will be described.

α1: Unstretched polyethylene film (thickness: 32 μm, density: 0.950 g/cm$^3$, corona treatment on a single surface)

α2: Unstretched polyethylene film (thickness: 25 μm, density: 0.952 g/cm$^3$, corona treatment on a single surface)

α3: Uniaxially stretched polyethylene film (thickness: 25 μm, density: 0.950 g/cm$^3$, corona treatment on a single surface)

α4: Biaxially stretched polyethylene film (thickness: 25 μm, density: 0.950 g/cm$^3$, corona treatment on a single surface)

α5: Unstretched polyethylene film (thickness: 35 μm, density: 0.926 g/cm$^3$, corona treatment on a single surface)

α6: Uniaxially stretched polyethylene film (thickness: 25 μm, density: 0.957 g/cm$^3$, corona treatment on a single surface)

(Preparation of Liquid Mixture for Undercoat Layer)

An acrylic polyol and a torylene diisocyanate were mixed so that the number of NCO groups in the torylene diisocyanate became equivalent to the number of OH groups in the acrylic polyol and diluted with ethyl acetate so that the total solid content (the total amount of the acrylic polyol and the torylene diisocyanate) reached 5 mass %. Furthermore, β(3,4 epoxycyclohexyetrimethoxysilane was added thereto so that the content thereof reached 5 parts by mass with respect to the total amount of the acrylic polyol and the torylene diisocyanate, which was 100 parts by mass, and mixed therewith.

A liquid mixture for an undercoat layer was obtained as described above.

(Preparation of Liquid Mixture for Overcoat Layer)

An "A" liquid, a "B" liquid and a "C" liquid shown below were each mixed together so that the mass fraction reached 70:20:10, thereby obtaining a liquid mixture for an overcoat layer.

"A" liquid: A hydrolysis solution having a solid content of 5 mass % ($SiO_2$-equivalent) obtained by adding 17.9 g of tetraethoxysilane ($Si(OC_2H_5)_4$) and 10 g of methanol to 72.1 g of 0.1 N hydrochloric acid and hydrolyzing them by stirring for 30 minutes "B" liquid: A 5 mass % water/methanol solution (the mass ratio between water and methanol was 95:5) of a polyvinyl alcohol "C" liquid: A hydrolysis solution obtained by diluting 1,3,5-tris(3-trimethoxysilylpropyl)isocyanurate to a solid content of 5 mass % with a liquid mixture of water and isopropyl alcohol (the mass ratio between water and isopropyl alcohol was 1:1)

Two kinds of adhesives used in adhesive layers will be described below.

(Urethane-Based Adhesive)

Adhesive obtained by mixing 11 parts by mass of TAKA-NATE A52 manufactured by Mitsui Chemicals, Inc. and 84 parts by mass of ethyl acetate with 100 parts by mass of TAKELAC A525 manufactured by Mitsui Chemicals, Inc.

(Gas Barrier Adhesive)

Adhesive obtained by mixing 16 parts by mass of MAXIVE C93T manufactured by Mitsubishi Gas Chemical Company, Inc. and 5 parts by mass of MAXIVE M-100 manufactured by Mitsubishi Gas Chemical Company, Inc. with 23 parts by mass of a solvent obtained by mixing ethyl acetate and methanol in a mass ratio of 1:1.

Materials of each configuration used in the examples and the comparative examples are shown in Table 2.

Example 2-1

As a base material, the resin film α1 was used. The liquid mixture for an undercoat layer was applied to the corona-treated surface (first surface) of the base material by a gravure coating method, dried and cured, thereby forming an undercoat layer having an application amount of 0.1 g/m².

Next, a 30 nm-thick transparent inorganic oxide layer (silica-deposited film) made of silicon oxide was formed on the undercoat layer with a vacuum deposition device by an electron beam heating method. The O/Si ratio of the inorganic oxide layer was set to 1.8.

Furthermore, the liquid mixture for an overcoat layer was applied onto the inorganic oxide layer by the gravure coating method, dried and cured, thereby forming an overcoat layer having a thickness of 0.3 μm.

A gas barrier film according to Example 2-1 was thus obtained.

The urethan-based adhesive was applied by the gravure coating method and dried on the overcoat layer of the gas barrier film according to Example 2-1, thereby forming an adhesive layer having a thickness of 3 μm. A 60 μm-thick unstretched film made of LLDPE (manufactured by Mitsui Chemicals Tohcello, Inc., trade name: TUX-MCS) was attached to this adhesive layer by dry lamination as a heat seal layer. After that, etching was performed at 40° C. for four days. Therefore, a laminate according to Example 2-1 was obtained.

28

Example 2-2

A gas barrier film and a laminate according to Example 2-2 were obtained by the same procedure as in Example 2-1 except that the resin film α2 was used as a base material.

Example 2-3

A gas barrier film according to Example 2-3 was obtained by the same procedure as in Example 2-1 except that the overcoat layer was not provided. The gas barrier adhesive was applied by a gravure coating method and dried on the inorganic oxide layer of the gas barrier film according to Example 2-3, thereby forming an adhesive layer having a thickness of 3 μm. A 60 μm-thick unstretched film made of LLDPE (manufactured by Mitsui Chemicals Tohcello, Inc., trade name: TUX-MCS) was attached to this adhesive layer by dry lamination as a heat seal layer. After that, etching was performed at 40° C. for four days. Therefore, a laminate according to Example 2-3 was obtained.

Example 2-4

A gas barrier film and a laminate according to Example 2-4 were obtained by the same procedure as in Example 2-3 except that the resin film α2 was used as a base material.

Example 2-5

A pattern was printed on one surface of the resin film α1 by a gravure printing method to provide a printed layer. The urethane-based adhesive was applied onto the printed layer to obtain a first film. Furthermore, the first film was attached to a surface on which no inorganic oxide layer was provided (second surface) in the base material of the gas barrier film according to Example 2-1 by dry lamination, thereby producing a gas barrier film according to Example 2-5. That is, the printed resin film α1 was attached to the laminate according to Example 2-1 to produce a laminate according to Example 2-5.

Figure 4:
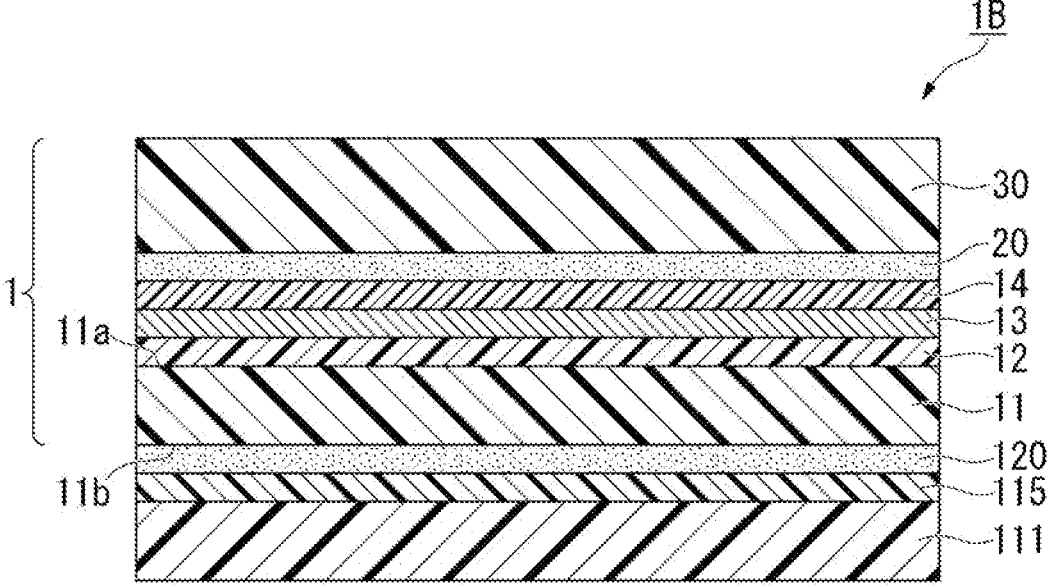
FIG. 4 is a schematic cross-sectional view of a laminate according to an example of the second embodiment.

The layer configuration of the laminate according to Example 2-5 is shown in FIG. 4. The base material of a laminate 1B shown in FIG. 4 is configured by joining a first polyethylene film 111 having a printed layer 115 to a second surface 11b of a base material 11 with an adhesive layer 120. That is, the base material according to Example 2-5 has a configuration where two polyethylene layers are joined together with an adhesive layer.

Example 2-6

A gas barrier film and a laminate according to Example 2-6 were obtained by the same procedure as in Example 2-5 except that the gas barrier film and the laminate according to Example 2-3 were used as a laminate that was attached to a first film.

Example 2-7

A gas barrier film and a laminate according to Example 2-7 were obtained by the same procedure as in Example 2-3 except that the resin film α5 was used as a base material and the undercoat layer was not provided.

Example 2-8

A gas barrier film and a laminate according to Example 2-8 were obtained by the same procedure as in Example 2-5 except that the gas barrier film and the laminate according to Example 2-7 were used.

Comparative Example 2-1

A gas barrier film and a laminate according to Comparative Example 2-1 were obtained by the same procedure as in Example 2-1 except that the resin film α3 was used as a base material.

Comparative Example 2-2

A gas barrier film and a laminate according to Comparative Example 2-2 were obtained by the same procedure as in Example 2-3 except that the resin film α3 was used as a base material.

Comparative Example 2-3

A gas barrier film and a laminate according to Comparative Example 2-3 were obtained by the same procedure as in Example 2-3 except that the resin film α4 was used as a base material.

Comparative Example 2-4

A gas barrier film and a laminate according to Comparative Example 2-4 were obtained by the same procedure as in Example 2-7 except that the resin film α6 was used as a base material.

The following items were evaluated using the gas barrier films and the laminates of the examples and the comparative examples.

(Measurement of Crystallinity of Base Material)

Before the production of the gas barrier films, the crystallinity of the base materials was measured under the following conditions.

An X-ray diffraction pattern of the base material was obtained by performing 2θ/θ scanning at a diffraction angle within a range of 10° to 30° in an out-of-plane mode using a wide-angle X-ray diffractometer manufactured by Rigaku Corporation. X-ray CuKα was used as an X ray and made parallel with a multilayer film mirror and incident, and a scintillation detector equipped with a flat plate collimator was used as a light-receiving unit.

The areas of crystal peaks and an amorphous peak were obtained from the obtained X-ray diffraction pattern, and the ratio of the crystal peak area to the area of all peaks was calculated as the crystallinity.

In a case where the base material had a plurality of layers, the crystallinity of a layer that configured the first surface was measured.

(Recyclability)

The proportion (wt %) of the polyethylene in the laminate of each example was calculated based on the following formula (1).

$$(\text{Mass of resin films } \alpha 1 \text{ to } \alpha 4 \text{ used} + \text{mass of heat seal layer})/\text{mass of entire laminate} \times 100 \qquad (1)$$

Evaluation was performed based on the following two levels.

O (good): The proportion of the polyethylene in the laminate is 90 mass % or more.

X (bad): The proportion of the polyethylene in the laminate is less than 90 mass %.

(Lamination Strength Between Base Material and Heat Seal Layer)

According to JIS Z 1707, a 15 mm-wide strip-like test piece was cut out from the laminate of each example, and the lamination strength between the base material and the heat seal layer was measured using a TENSILON universal testing instrument RTC-1250 manufactured by A&D Manufacturing Company, Limited. The following two conditions were set.

T-type peeling Normal ("Dry T" in Table 2)

T-type peeling Measurement portion wet ("Wet T" in Table 2)

(Oxygen Transmission Rate: OTR)

The laminate of each example was measured by a MOCON method under conditions of 30° and 70% RH (relative humidity).

(Water Vapor Transmission Rate: WVTR)

The laminate of each example was measured by a MOCON method under conditions of 40° and 90% RH.

The results are shown in Table 2.

TABLE 2

| | Layer configuration | | | Crystal-linity (%) | Recyclability | | Lamination strength (N) | | OTR (cc/m² · day · atm) | WVTR (g/m² · day) |
| | Base material | Overcoat layer | Adhesive layer | | Polyethylene proportion (wt %) | Evaluation | Dry T | Wet T | | |
|---|---|---|---|---|---|---|---|---|---|---|
| Example 2-1 | α1 | Present | Urethane-based adhesive | 14.8 | 97.2 | O | >5 | >5 | 2.8 | 1.5 |
| Example 2-2 | α2 | Present | Urethane-based adhesive | 20.6 | 96.9 | O | >5 | >5 | 2.6 | 1.5 |
| Example 2-3 | α1 | Absent | Gas barrier adhesive | 14.8 | 97.6 | O | >5 | >5 | 0.4 | 0.6 |
| Example 2-4 | α2 | Absent | Gas barrier adhesive | 20.6 | 97.4 | O | >5 | >5 | 0.5 | 0.6 |
| Example 2-5 | α1 two layers | Present | Urethane-based adhesive | 14.8 | 96.3 | O | >5 | >5 | 2.5 | 1.1 |
| Example 2-6 | α1 two layers | Absent | Gas barrier adhesive | 14.8 | 96.6 | O | >5 | >5 | 0.3 | 0.4 |
| Example 2-7 | α | Absent | Gas barrier adhesive | 23.1 | 97.7 | O | >5 | >5 | 0.5 | 0.7 |
| Example 2-8 | α1 + α5 | Absent | Gas barrier adhesive | 23.1 | 95.5 | O | >5 | >5 | 0.4 | 0.7 |
| Comparative Example 2-1 | α3 | Present | Urethane-based adhesive | 71.8 | 96.9 | O | 1.7 | 1.7 | 1.3 | 0.9 |
| Comparative Example 2-2 | α3 | Absent | Gas barrier adhesive | 71.8 | 97.4 | O | 1.7 | 1.7 | 0.2 | 0.2 |

TABLE 2-continued

| | Layer configuration | | | Crystal- | Recyclability Polyethylene | | Lamination strength (N) | | OTR | WVTR |
|---|---|---|---|---|---|---|---|---|---|---|
| | Base material | Overcoat layer | Adhesive layer | linity (%) | proportion (wt %) | Evalu- ation | Dry T | Wet T | (cc/m² · day · atm) | (g/m² · day) |
| Comparative Example 2-3 | α4 | Present | Gas barrier adhesive | 55.9 | 97.4 | ○ | 1.2 | 1.2 | 0.5 | 0.7 |
| Comparative Example 2-4 | α6 | Absent | Gas barrier adhesive | 71.8 | 97.5 | ○ | 1.5 | 1.5 | 0.2 | 0.5 |

In all of the examples, the recyclability was favorable, and the adhesion strengths between the base material and the heat seal layer were also sufficient. Particularly, it is found that, in the examples, the crystallinity of the base material on the first surface side was 14.8% or more and 35% or less and the lamination strengths were sufficient. In addition, all of the examples exhibited a favorable gas barrier property, especially, Examples 2-3, 2-4 and 2-6 where the gas barrier adhesive was used were particularly excellent in terms of the gas barrier property.

On the other hand, in each comparative example, while the recyclability was favorable, the adhesion strength between the base material and the heat seal layer was not sufficient, and there was a concern that delamination, bag breakage or the like might occur depending on uses or the like.

Hitherto, the embodiments and the examples of the present invention have been described, but the specific configuration is not limited to these embodiments, and a variety of modifications can be added thereto within the scope of the gist of the present invention.

For example, in the gas barrier film 10 including the base material 11 containing a polyethylene as a main resin component and the inorganic oxide layer 13 formed on the first surface side 11a of the base material, the birefringence ΔN of the first surface 11a calculated based on measured by the parallel Nicol rotation method may be 0 or more and 0.007 or less, and the crystallinity of the base material 11 on the first surface 11a side may be 35% or less.

In addition, the laminate 1 may include the gas barrier film 10 in which the birefringence ΔN of the first surface 11a of the base material 11 calculated based on measured by the parallel Nicol rotation method is 0 or more and 0.007 or less and the crystallinity of the base material 11 on the first surface 11a side is 35% or less.

Additionally, it is possible to appropriately replace any of the configurational elements in the above-described embodiment with a well-known configurational element within the scope of the gist of the present invention, and the above-described embodiments or modification examples may be appropriately combined together.

What is claimed is:

1. A laminate comprising:
a gas barrier film including,
    a base material that is an unstretched film, and containing a polyethylene as a main resin component of the base material, and
    an inorganic oxide layer on a first surface side of the base material, and
a heat seal layer that is an unstretched film, the heat seal layer containing a polyethylene as a main resin component of the heat seal layer and being joined to the gas barrier film by an epoxy-based gas barrier adhesive layer on the inorganic oxide layer such that the inorganic oxide layer and the epoxy-based gas barrier adhesive layer are sandwiched between the base material and the heat seal layer without an overcoat layer between the base material and the heat seal layer,
wherein the base material has both;
    (i) a crystallinity on the first surface side of less than 30%, and
    (ii) a density in a range from 0.940 g/cm³ to 0.952 g/cm³,
a proportion of the polyethylene in an entirety of the gas barrier film is 90 mass % or more,
the laminate is without an oxygen barrier membrane containing water-swellable mica, and
a thickness of the epoxy-based gas barrier adhesive layer is within a range of 1 to 5 μm, and the thickness of the epoxy-based gas barrier adhesive layer is 50 times or more and 300 times or less than a thickness of the inorganic oxide layer.

2. The laminate of claim 1, further comprising:
an undercoat layer provided between the base material and the inorganic oxide layer.

3. The laminate of claim 1,
wherein the base material has a plurality of layers each layer of the plurality of layers containing the polyethylene as a main resin component of each layer.

4. The laminate of claim 1,
wherein a proportion of the polyethylene in the laminate is 90 mass % or more.

5. The laminate of claim 1,
wherein crystallinity of the base material on the first surface side is 23.1% or less.

6. The laminate of claim 4,
wherein a lamination strength between the base material and the heat seal layer measured according to JIS K 6854 is 2 N or higher.

7. The laminate of claim 1, wherein the base material contains the polyethylene alone as the main resin component of the base material.

8. The laminate of claim 1, wherein the base material has a density of 0.950 g/cm³ to 0.952 g/cm³.

9. The laminate of claim 1, wherein the first surface side of the base material has a birefringence ΔN of 0 or more and 0.007 or less based on measurement by a parallel Nicol rotation method.

10. The laminate of claim 1, wherein the base material has a thickness of 10 μm or more and 40 μm or less.

11. The laminate of claim 4,
wherein a lamination strength between the base material and the heat seal layer measured according to JIS K 6854 is 5 N or higher.

12. The laminate of claim 4 configured in a packaging material formed using the laminate.

* * * * *